United States Patent
Hayakawa et al.

(10) Patent No.: US 9,584,854 B2
(45) Date of Patent: Feb. 28, 2017

(54) INFORMATION DISTRIBUTION METHOD, COMPUTER PROGRAM, INFORMATION DISTRIBUTION APPARATUS AND MOBILE COMMUNICATION DEVICE

(71) Applicant: SHARP KABUSHIKI KAISHA, Osaka-shi, Osaka (JP)

(72) Inventors: Susumu Hayakawa, Osaka (JP); Toshihiko Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/406,883

(22) PCT Filed: Jun. 14, 2013

(86) PCT No.: PCT/JP2013/066422
§ 371 (c)(1),
(2) Date: Dec. 10, 2014

(87) PCT Pub. No.: WO2013/187494
PCT Pub. Date: Dec. 19, 2013

(65) Prior Publication Data
US 2015/0201234 A1  Jul. 16, 2015

(30) Foreign Application Priority Data

Jun. 15, 2012  (JP) ................................ 2012-136100
Jun. 11, 2013  (JP) ................................ 2013-123046

(51) Int. Cl.
H04H 20/14   (2008.01)
H04N 21/436  (2011.01)
(Continued)

(52) U.S. Cl.
CPC ....... *H04N 21/43615* (2013.01); *G06F 3/017* (2013.01); *G06F 13/00* (2013.01);
(Continued)

(58) Field of Classification Search
CPC ......... H04N 21/41415; H04N 21/4223; H04N 21/44008
See application file for complete search history.

(56) References Cited

U.S. PATENT DOCUMENTS

2004/0010599 A1* 1/2004 Otobe ................ G07C 9/00031
                                                 709/228
2004/0119852 A1* 6/2004 Shin ................... H04N 5/23296
                                                 348/240.2
(Continued)

FOREIGN PATENT DOCUMENTS

JP    2003-122757 A    4/2003
JP    2003-315078 A    11/2003
(Continued)

OTHER PUBLICATIONS

Yamashita et al., "Design and Evaluation of Handheld Card for Browsing Disital Content with Mobile Phone Based on Magnifying Glass Metaphor", The Second Forum on Data Engineering and Informaiton Management 2010-Ronbunshu, A6-I, May 25, 2010, 7 pages.

*Primary Examiner* — Pankaj Kumar
*Assistant Examiner* — Timothy Newlin
(74) *Attorney, Agent, or Firm* — Birch, Stewart, Kolasch & Birch, LLP

(57) ABSTRACT

Provided are: an information providing system, an information providing method and a computer program, which are able to detect a position on a screen of a display specified by each of multiple users who view the screen, and to provide each user with information according to the position.
In an information distribution system including a computer 1 having a storage part in which information having a hierarchical structure is stored, a display 2 connected to the computer 1 and displaying the information, and a mobile communication device 3 communicating with the computer (Continued)

1, the mobile communication device 3 has an image obtaining part for photographing a part of the information displayed on the display 2 and obtaining an image, and a transmission part transmitting the obtained image to the computer 1, and the computer 1 is configured to have a reading part reading out the information having a hierarchical structure from the storage part based on the image transmitted from the mobile communication device 3 and a transmission part transmitting the read-out information to the mobile communication device 3.

10 Claims, 31 Drawing Sheets

(51) Int. Cl.
*G06F 13/00* (2006.01)
*H04N 21/81* (2011.01)
*G06F 17/30* (2006.01)
*G06F 3/01* (2006.01)

(52) U.S. Cl.
CPC ..... *G06F 17/30058* (2013.01); *H04N 21/436* (2013.01); *H04N 21/812* (2013.01)

(56) References Cited

U.S. PATENT DOCUMENTS

| | | | |
|---|---|---|---|
| 2004/0208372 A1* | 10/2004 | Boncyk | G06F 17/30256 382/181 |
| 2006/0001757 A1* | 1/2006 | Sawachi | G01C 21/20 348/333.12 |
| 2006/0038833 A1* | 2/2006 | Mallinson | A63F 13/02 345/633 |
| 2006/0069681 A1* | 3/2006 | Lauper | G06F 17/30265 |
| 2007/0159522 A1* | 7/2007 | Neven | G06Q 30/02 348/14.02 |
| 2007/0279521 A1* | 12/2007 | Cohen | G06K 9/00664 348/376 |
| 2008/0154492 A1* | 6/2008 | Tanino | G01C 21/00 701/532 |
| 2009/0175499 A1* | 7/2009 | Rosenblatt | G06K 9/228 382/103 |
| 2010/0191459 A1* | 7/2010 | Carter | G01C 21/32 701/532 |
| 2011/0213664 A1 | 9/2011 | Osterhout et al. | |
| 2012/0153017 A1* | 6/2012 | Bracalente | H04N 21/4367 235/375 |
| 2012/0311642 A1* | 12/2012 | Ginn | H04N 21/25841 725/62 |
| 2013/0113936 A1* | 5/2013 | Cohen | G07B 15/02 348/148 |
| 2013/0286199 A1* | 10/2013 | Di Censo | H04N 1/00129 348/143 |
| 2013/0340006 A1* | 12/2013 | Kwan | H04N 5/445 725/39 |
| 2015/0201234 A1* | 7/2015 | Hayakawa | G06F 13/00 725/35 |

FOREIGN PATENT DOCUMENTS

| | | |
|---|---|---|
| JP | 2005-056054 A | 3/2005 |
| JP | 2006-003963 A | 1/2006 |
| JP | 2006-038907 A | 2/2006 |
| JP | 2008-191868 A | 4/2008 |
| JP | 2009-230193 A | 10/2009 |
| JP | 2011-180711 A | 9/2011 |

* cited by examiner

F I G. 25
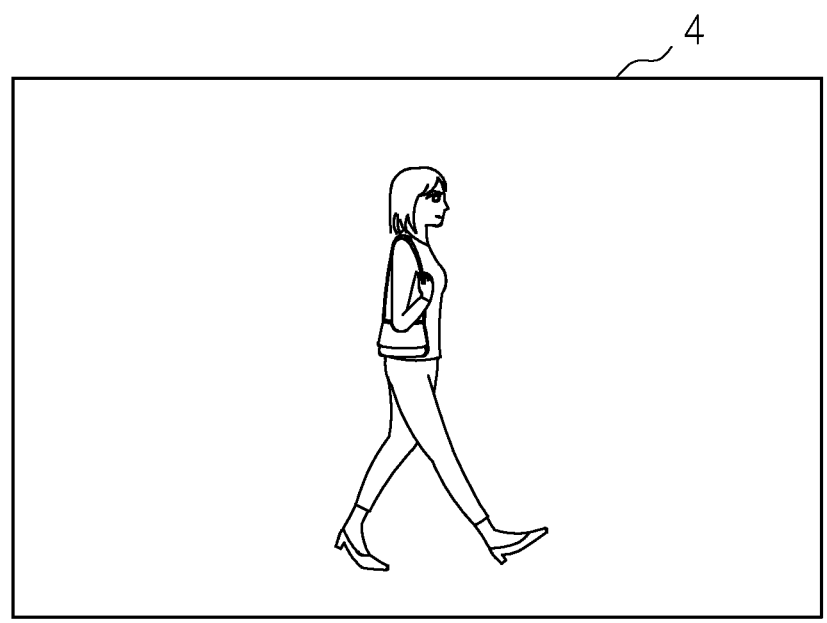
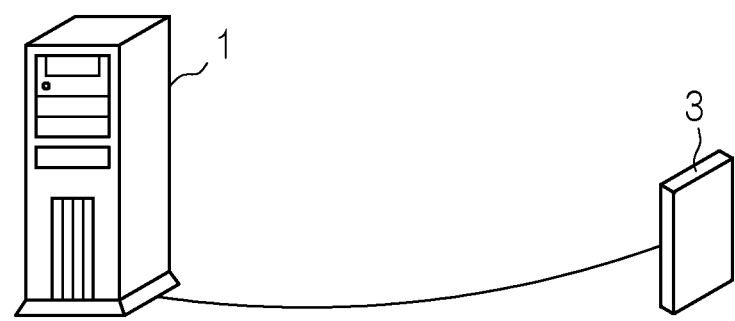

INFORMATION DISTRIBUTION METHOD, COMPUTER PROGRAM, INFORMATION DISTRIBUTION APPARATUS AND MOBILE COMMUNICATION DEVICE

CROSS-REFERENCE TO RELATED APPLICATIONS

This application is the national phase under 35 U.S.C. §371 of PCT International Application No. PCT/JP2013/066422 which has an International filing date of Jun. 14, 2013 and designated the United States of America.

TECHNICAL FIELD

The present invention relates to an information distribution method for distributing information from a computer to a mobile communication apparatus, and to a computer program, an information distribution apparatus and a mobile communication device.

BACKGROUND ART

In recent years, the size of a mobile terminal has been reduced while the function thereof has been enhanced. Along with such circumstances, the amount of information handled by a mobile terminal has significantly been increased. The method of browsing information, however, remains unchanged and outdated, which cannot be said to have high browsability. Specifically, in browsing data having a hierarchical structure, it is necessary to move between levels (switch layers) other than the operation for the level (layer) being displayed, while no intuitive browsing method has been found yet.

Japanese Patent Application Laid-Open No. 2005-56054 describes a system including an information providing server, a display and a video camera, in which, by applying flash light or the like to a portion required for its detailed information by a user, among the contents shown on a display, the information providing server detects the position irradiated with the flash light from the image thereof photographed by the video camera, and more detailed information for the content displayed at the detected position is displayed on a display device.

BRIEF SUMMARY OF THE INVENTION

Problems to be Solved

The system described in Patent Document 1, however, requires a video camera with a display apparatus, and a light emitting device emitting flash light in a mobile terminal. Moreover, the display device can be used by only one user at the same time.

The present invention has been made in view of the circumstances described above. An object of the invention is to provide an information distribution method, a computer program, an information distribution apparatus and a mobile communication device, capable of allowing each user who views a display screen to intuitively designate a position he/she is gazing at, detecting the position on a screen designated by the user and providing the user with information in accordance with the position.

Means for Solving Problems

An information distribution method according to the present invention is characterized in that a computer displays information having a hierarchical structure on a display, obtains an image obtained by photographing a part of the information displayed on the display, detects a position of the obtained image in an image displayed on the display, specifies information having a hierarchical structure corresponding to the obtained image based on a detected result, selects information for generating an enlarged image or a reduced image of the obtained image, or an image for displaying information of a level different from a level displayed in the obtained image, based on a specified result, and outputs the selected information.

According to the present invention, it is possible for a user to designate a part of information shown on a display at which the user is gazing by an intuitive operation of photographing with a mobile communication device, and to obtain information related to the gazed part.

A computer program according to the present invention is characterized by causing a computer to execute the steps of detecting a position of the image, obtained by photographing a part of information having a hierarchical structure displayed on the display, in an image displayed on the display, specifying information having a hierarchical structure corresponding to the photographed image based on a detected result, and selecting information for generating an image for displaying an enlarged image or a reduced image of the photographed image or for displaying information of a level different from a level displayed in the photographed image, based on a specified result.

According to the present invention, the user is able to designate the gazed part in the information shown in a display by an intuitive operation of photographing with a mobile communication device and to obtain the information related to the gazed part.

An information distribution apparatus according to the present invention transmitting information having a hierarchical structure stored in a storage part to a mobile communication device is characterized by comprising: a distribution part distributing the information to a display; a reception part receiving by the mobile communication device an image corresponding to a part of the information displayed on the display, obtained by photographing with the mobile communication device; a reading part reading out information having a hierarchical structure from the storage part based on the received image; and a transmission part transmitting the read-out information to a mobile communication device.

According to the present invention, based on the image photographed with the mobile communication device, the information distribution apparatus reads out information having a hierarchical structure and transmits the information to the mobile communication device. This makes it possible for the user to designate the gazed part in the information shown in a display by an intuitive operation of photographing with a mobile communication device and to obtain the information related to the gazed part.

The information distribution apparatus according to the present invention is characterized in that the reading part includes a detection part detecting a position of the received image on a display surface of the display, and a specifying part specifying information having a hierarchical structure corresponding to the received image based on a detection result by the detection part, that the image distribution apparatus comprises a distance reception part receiving a distance between the mobile communication device and the display from the mobile communication device, and that information for generating an image corresponding to an enlarged image or a reduced image of the received image from the storage part based on the information specified by the specifying part and the received distance.

According to the present invention, based on the distance between the mobile communication device and the display, an enlarged or reduced image of the partial image on the display transmitted from the mobile communication device is generated from the information having a hierarchical structure stored in the storage part and transmitted to the mobile communication device, it is possible for the user to view an image of good visibility.

The information distribution apparatus according to the present invention is characterized by comprising a distance reception part receiving the distance between the mobile communication device and the display from the mobile communication device, and is characterized in that the reading part is configured to determine a level of the information to be read out from the storage part and/or a level of the information to be transmitted to the mobile communication device, based on the received distance.

According to the present invention, based on the distance between the mobile communication device and the display, it is configured to determine the level of the information to be read out from the reading part and/or the level of the information to be transmitted to the mobile communication device, so that the level of the information displayed on the mobile communication device is changed by making the mobile communication device closer to or farther away from the display. The user is able to switch the levels of information by an intuitive operation.

The information distribution apparatus according to the present invention is characterized by comprising an inclination reception part receiving by the mobile communication device an inclination of the mobile communication device in a plane parallel to the display surface of the display, and is characterized in that the specifying part specifies information having the hierarchical structure corresponding to the transmitted image using the received inclination.

According to the present invention, the inclination of the mobile communication device is transmitted to a computer. The computer uses the received inclination to specify information having a hierarchical structure corresponding to the transmitted image, allowing the specifying process to efficiently be performed compared to the case without the use of inclination.

The information distribution apparatus according to the present invention is characterized in that the distribution part is configured to distribute pieces of information respectively having different hierarchical structures to a plurality of displays, and the information distribution apparatus comprises a second specifying part specifying a display from which the mobile communication device obtained an image, by matching between an image to be displayed in each of the plurality of displays and an image received by the mobile communication device.

According to the present invention, information is distributed to multiple displays, which makes it possible to offer services to a larger number of users. Moreover, since matching between the image received from the mobile communication device and the image to be shown on the display is used to specify a display, it is unnecessary for the user to perform operation such as entering information related to the display.

An information distribution method is characterized in that a computer distributes information having a hierarchical structure to a display; receives an image obtained by photographing a part of the information displayed on the display; detects a position of the received image on a display surface of the display; specifies information having a hierarchical structure corresponding to the obtained image, based on a detected result; reads out the information from a storage part based on a specified result; and transmits the read-out information to a mobile communication device.

According to the present invention, it is possible for the user to designate the gazed part in the information shown in a display by an intuitive operation of photographing with a mobile communication device and to obtain the information related to the gazed part.

A mobile communication device according to the present invention is characterized by comprising: an image obtaining part photographing a display on which information having a hierarchical structure is displayed and obtaining an image corresponding to a part of the information; an image transmission part transmitting the obtained image to an information distribution apparatus; a reception part receiving the transmitted information based on the transmitted image; and a display part displaying the received information.

According to the present invention, it is possible for the user to designate a part he/she is gazing at in the information shown on a display by an intuitive operation of photographing with a mobile communication device and to obtain the information related to the gazed part.

Effects of Invention

According to the present invention, a computer is configured to receive an image obtained by photographing a part of the information shown on a display from a mobile terminal, to read out information having a hierarchical structure based on the received image, and to transmit the information to the mobile terminal, which allows the user to designate the part of the information shown on the display at which the user is gazing by an intuitive operation, and thus allows the computer to accurately provide the user with desired information.

BRIEF DESCRIPTION OF THE DRAWINGS

FIG. 25 is an explanatory view illustrating a schematic configuration of an information providing system according to Embodiment 6;

BEST MODE FOR CARRYING OUT THE INVENTION

Embodiment 1

The present invention will now be described with reference to the drawings illustrating the embodiments thereof.

Figure 1:
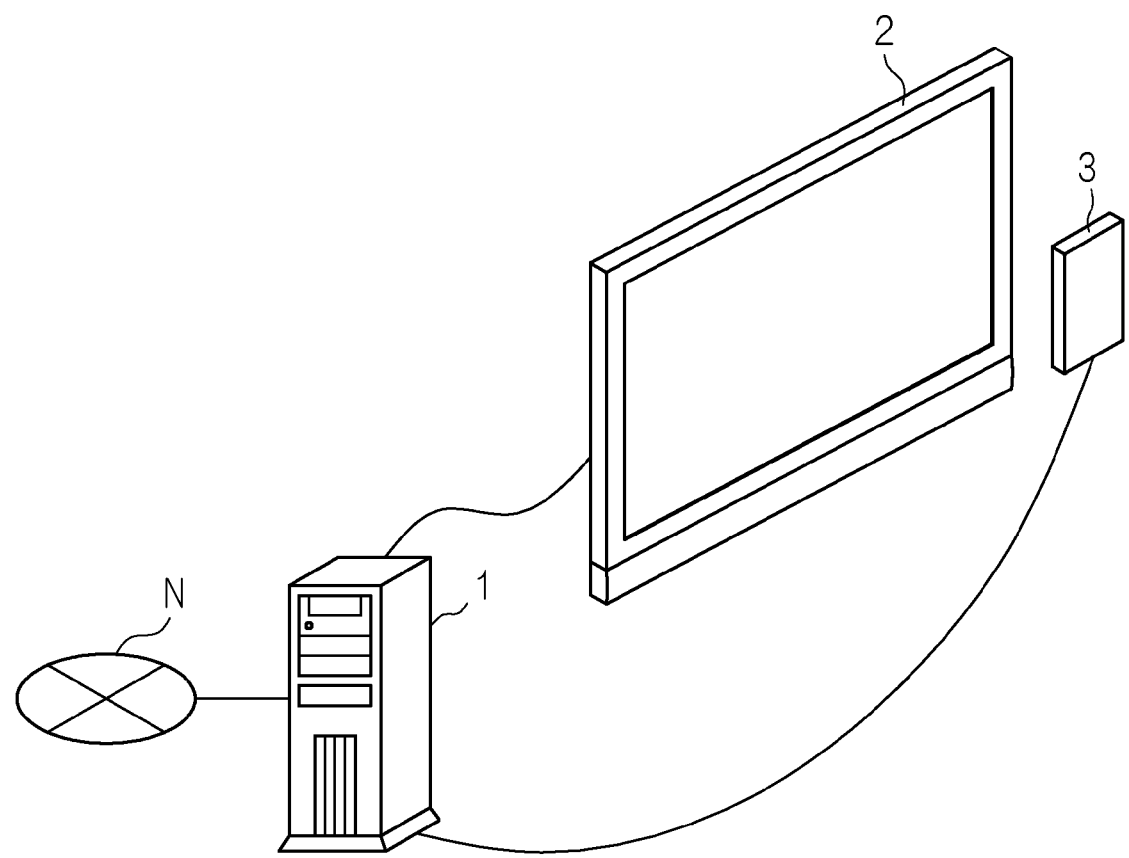
FIG. 1 is an explanatory view illustrating a schematic configuration of an information providing system according to Embodiment 1.

FIG. 1 is an explanatory view illustrating a schematic configuration of an information providing system according to Embodiment 1. The information providing system includes a content server 1 (computer), a display 2 and a mobile terminal 3 (mobile communication device). The content server 1 and display 2 are connected to each other with wires through DVI (Digital Visual Interface), HDMI (registered trademark) (High Definition Multimedia Interface), VGA (Video Graphics Array) or the like, or wirelessly through a UWB (Ultra Wide Band) system, wireless USB (Universal Serial Bus), intel (registered trademark) WiDi (Wireless Display) or the like. The display 2 shows content data output by the content server 1. The content server 1 and mobile terminal 3 communicate with each other using USB, WiFi (Wireless Fidelity), IEEE (Institute of Electrical and Electronic Engineers) 1394, Bluetooth (registered trademark), WiMAX (Worldwide Interoperability for Microwave Access) or the like.

Figure 2:
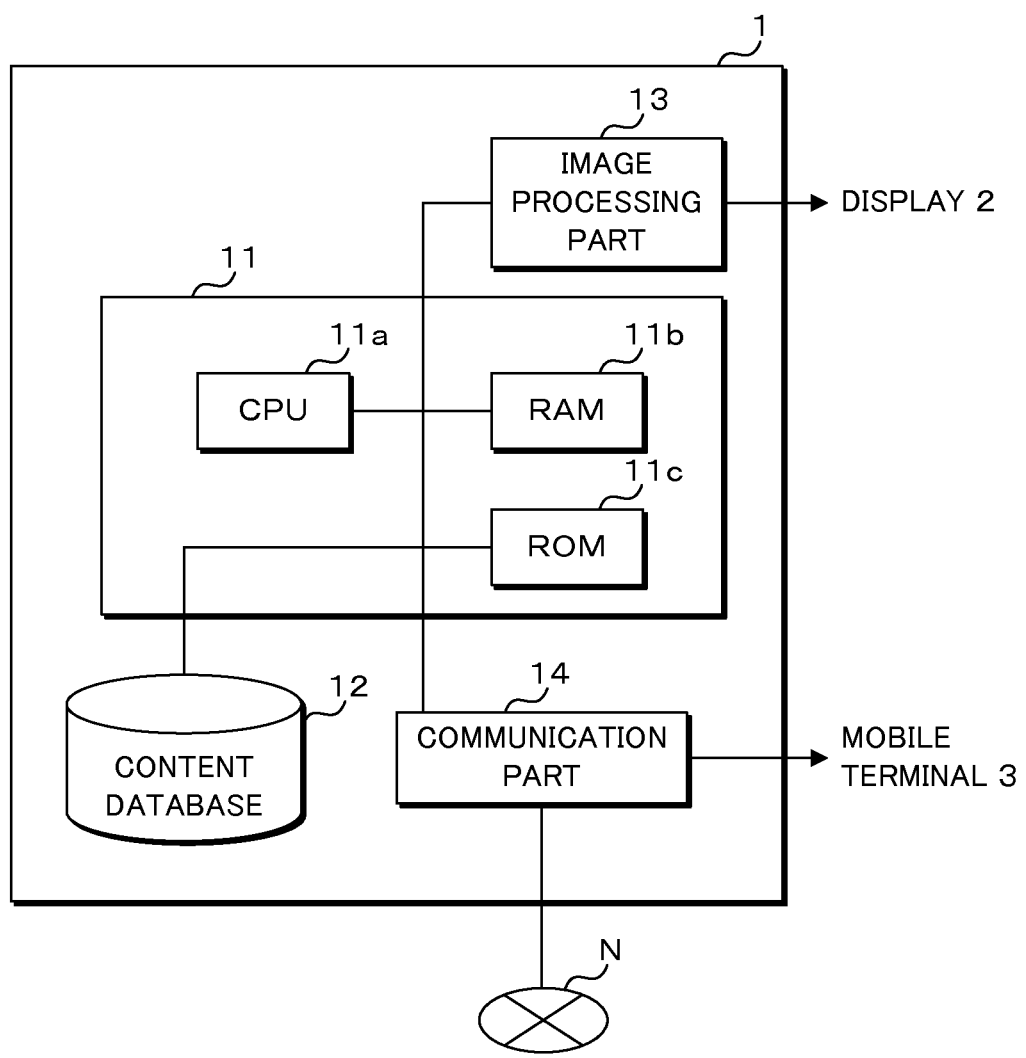
FIG. 2 is an explanatory view illustrating a hardware configuration of a content server.

FIG. 2 is an explanatory view illustrating a hardware configuration of the content server 1. The content server 1 includes a control part 11, a content database 12 (storage part), an image processing part 13 and a communication part 14 (transmission part). The control part 11 includes a CPU (Central Processing Unit) 11a, a RAM (Random Access Memory) 11b and a ROM (Read Only Memory) 11c.

The CPU 11a is connected to each of the hardware units through a bus. The CPU 11a controls each hardware unit in accordance with a control program (computer program) stored in the ROM 11c. The RAM 11b is, for example, an SRAM (static RAM), a DRAM (Dynamic RAM) or a flash memory. The RAM 11b temporarily stores various data generated when various types of programs are executed by the CPU 11a. The content database 12 stores therein contents with a hierarchical structure (information with hierarchical structure) to be provided to the mobile terminal 3. The image processing part 13 generates an image to be displayed on the display 2, and outputs the image to the display 2. The communication part 14 includes a function of communicating with the mobile terminal 3 as well as a function of communicating with another computer through a network N. The network N corresponds to, for example, the Internet, WAN (Wide Area Network) or a packet switched network.

Figure 3:
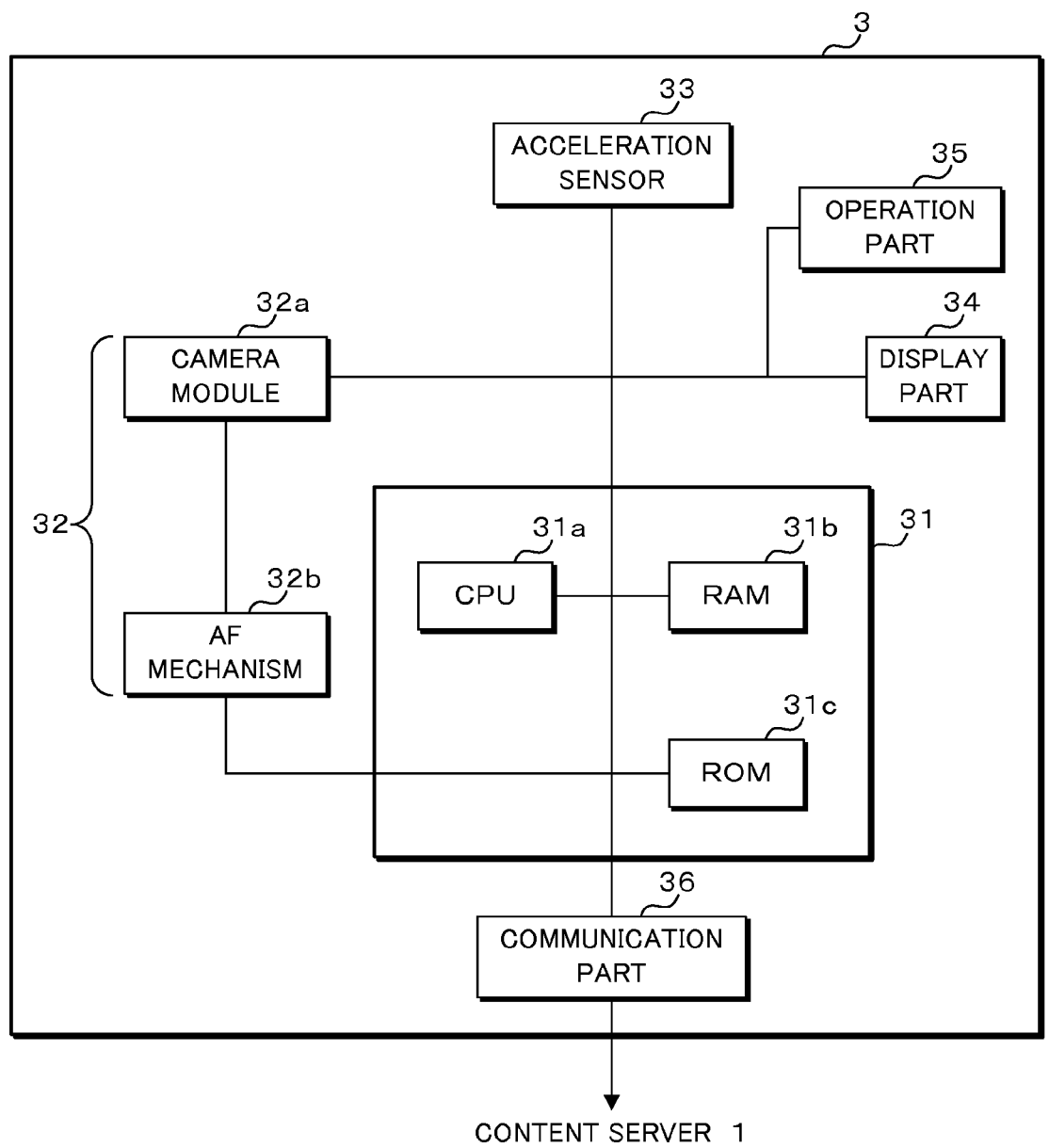
FIG. 3 is an explanatory view illustrating a hardware configuration of a mobile terminal.

FIG. 3 is an explanatory view illustrating a hardware configuration of the mobile terminal 3. The mobile terminal 3 includes a control part 31, a camera part 32 (image obtaining part), an acceleration sensor 33 (measurement part), a display part 34, an operation part 35 and a communication part 36 (transmission part). The control part 31 includes a CPU 31a, a RAM 31b and a ROM 31c.

The CPU 31a is connected to each of the hardware units through a bus. The CPU 31a controls each hardware unit in accordance with a control program stored in the ROM 31c. The RAM 31b may be, for example, an SRAM (Static RAM), a DRAM (Dynamic RAM) or a flash memory. The RAM 31b temporarily stores various data generated when the CPU 31a executes various types of programs.

The camera part 32 includes a camera module 32a and an AF (Auto Focus) mechanism 32b. The camera module 32a includes a lens system, an imaging device and the like, and obtains an image. The AF (Auto Focus) mechanism 32b controls the lens system of the camera module 32a to automatically bring the lens into focus. The acceleration sensor 33 differentiates the measured acceleration of the mobile terminal 3 in a predetermined direction to calculate the inclination of the mobile terminal 3. On the display part 34, the image photographed by the camera module 32a, the contents transmitted by the content server 1, a button for operation, a menu and the like are displayed. The operation part 35 includes, for example, a button for operating the mobile terminal 3 and a touch panel for using the display part 34 in the operation.

The communication part 36 communicates with the content server 1. The mobile terminal 3 transmits to the content server 1, for example, the image photographed by the camera module 32a, the distance to the display 2, the inclination angle of the mobile terminal 3 obtained from the value measured by the acceleration sensor 33, and operation information. From the content server 1, content image and the like are transmitted.

Figure 4:
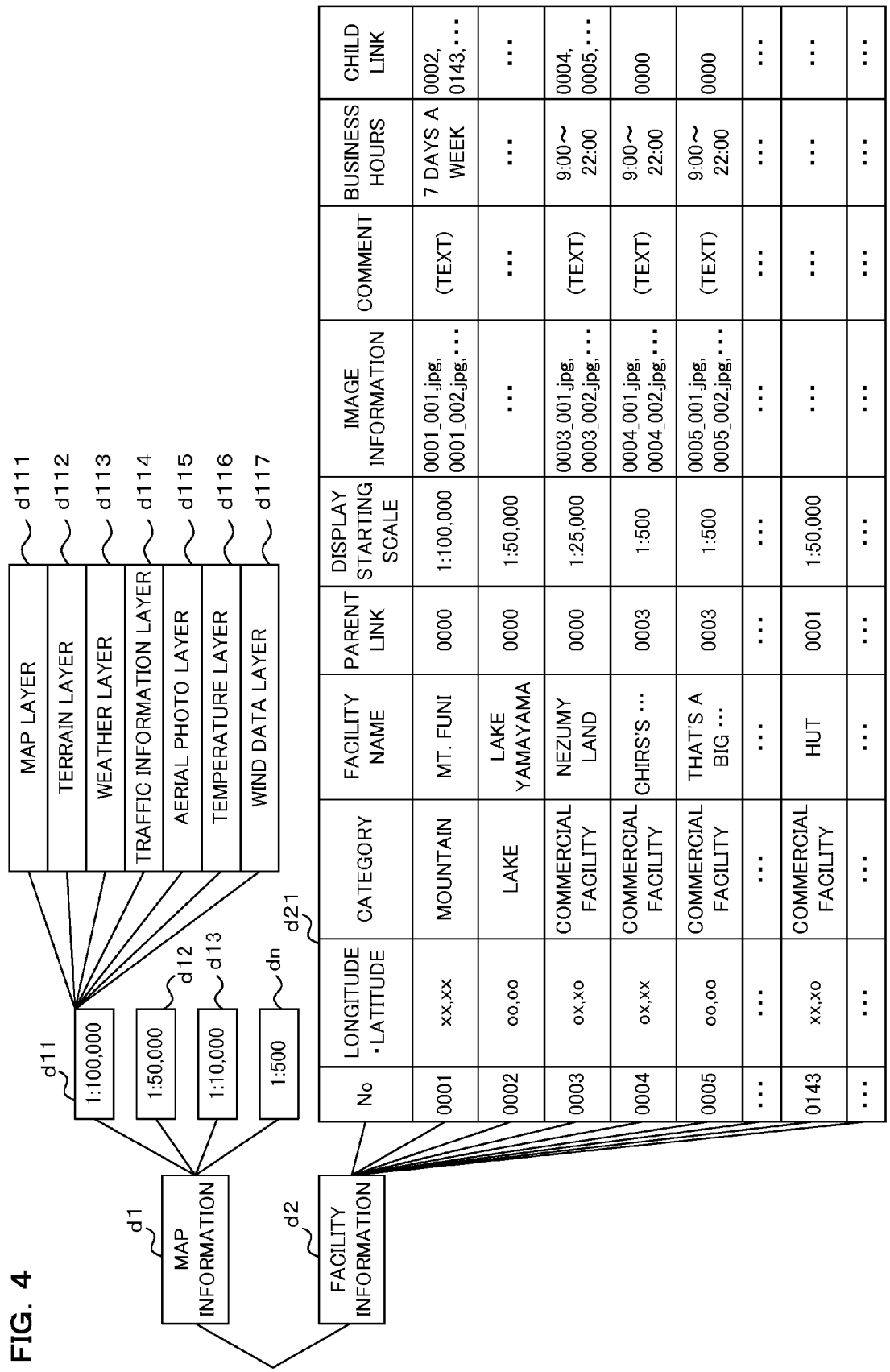
FIG. 4 is an explanatory view illustrating an example of contents having a hierarchical structure, stored in a content database.

FIG. 4 is an explanatory view illustrating an example of contents having a hierarchical structure, stored in the content database 12. FIG. 4 illustrates a content for facility guide using a map. The content has a hierarchical structure with three levels. The first level is comprised of map information d1 and facility information d2. The map information d1 includes, at the second level, maps of different scales such as a 1:100,000 map d11 a 1:50,000 map d12, a 1:10,000 map d13 . . . and the like. At the third level, the map d11, d12, d 13 . . . includes a map layer d111, a terrain layer d112, a weather layer d113, a traffic information layer d114, an aerial photo layer d115, a temperature layer d116, a wind data layer d117 and the like. The facility information d2 includes, at the second level, facility data d21 representing each facility. The facility information d2 is data with hierarchical structure, in which the parent-child relationship between records can be defined.

The map layer d111 is map information which serves as a base, and includes line data such as boundaries of prefectures, boundaries of cities, towns and villages, transportation network (trains, stations and ferry routes), highways and toll roads, main roads, road edges (double lines), polygon data such as main building data, housing data, water surface data (sea, rivers, lakes), green space data, and also includes point data such as annotations and route numbers.

The terrain layer d112 corresponds to polygon data visually representing altitude with color gradation and shadow based on contour data. The weather layer d113 corresponds to point data for displaying weather forecast. The weather layer d113 has information on today's weather, tomorrow's weather and the like as attribute data. Geographical information (e.g., longitude and latitude) for the weather layer d113 is fixed data, whereas the weather forecast data which is the attribute data is dynamic data. The weather forecast data is obtained from another server or the like through the network N.

The traffic information layer d114 corresponds to line data for showing road congestion situation and the like. The traffic information layer d114 includes geographical information as fixed data and attribute data indicating congestion situation as dynamic data. An example of the geographical information as fixed data includes DRM (Digital Road Map) data of Japanese Digital Road Map Association. In the DRM data, all roads are expressed by nodes and links, so that uniform processing is possible. A node corresponds to an intersection and other nodal points for expressing road network. A link is a road section between nodes. An ID is assigned each of the nodes and links. Having attribute data for each link allows congestion situation to be expressed for each link. The congestion situation data is obtained from other server or the like through the network N. Here, it is also possible to obtain a link ID and congestion situation if the other server is compatible with DRM data.

The aerial photo layer d115 is comprised of image data referred to as, a so-called ortho image. The ortho image is an image obtained by correcting distortion occurring in an aerial photograph.

The temperature layer d116 corresponds to point data showing a temperature. The wind data layer d117 is point data showing a wind direction and a wind speed. While the geographical information (longitude, latitude and the like) is fixed data as with the weather layer d113, the temperature, wind direction, wind speed that are attribute data correspond to dynamic data. These pieces of data are obtained from another server or the like through the network N.

Among the above-described layers, the aerial photo layer d115 is raster data, while the other layers may be either vector data or raster data. Also, it is not necessary for all the layers to be included in the maps of all scales. An appropriate layer may be selected for each scale to create data. While the map layer d111 serving as a base includes multiple pieces of data, it is not necessary for the maps of all scales to include the same data, and appropriate data may be selected for each scale to create data.

In the case of vector data, as long as the data has high accuracy and the display time is in a practical range, common data may be employed for a map of a small scale (1:100,000 for example) to a map of a large scale (1:500 for example).

The facility information d2 includes number (No.), latitude and longitude, category, facility name, parent link, scale at which information starts to be displayed (hereinafter referred to as "display starting scale"), image information, comment, business hours and child link. Under the number (No.), a sequential number which is to be an ID of a facility is stored. Under the latitude and longitude, values of the latitude and longitude indicating the geographical position of a facility are stored. As a value of a latitude, "+" is added to a north latitude whereas "−" is added to a south latitude. As a value of a longitude, "+" is added to an east longitude whereas "−" is added to a west longitude. The positive and negative signs allow the user to easily distinguish between the north latitude and south latitude as well as the east longitude and west longitude. Under the category, a text representing a category of a facility is stored. The text representing a category includes, for example, mountain, lake, commercial facility or the like.

Under the facility name, a text representing the name of a facility is stored. The parent link and the child link are the fields for showing the hierarchical structure of data. Under the parent link, an ID of a record with a higher level is stored. Under the child link, an ID of a record with a lower level is stored. For example, the record at No. 0004 has a parent link having a value of 0003, which shows that the record of No. 0003 is a record with a higher level. Therefore, No. 0004 is written in the field of the child link for the record of No. 0003.

For both the parent and child links, the value 0000 indicates that no record to be linked exists. For example, the record at No. 0002 has the value 0000 for its parent link, which indicates that no record exists at a higher level. Moreover, the record at No. 0004 has the value 0000 for the child link, which indicates that no record exists at a lower level.

Under the display starting scale, the value of the minimum scale to be used when information of each record is displayed on a map is stored. For example, the record at No. 0001 indicates that the information starts being displayed from the scale of 1:100,000, and is displayed at a scale larger than that but is not displayed at a scale smaller than that.

Under the image information, image data related to a facility is stored. In the example of FIG. 4, not the data itself but a jpg file name therefor is stored. Under the comment, a comment on a facility is stored as a text. Under the business hours, business hours of a facility is stored.

Figure 5:
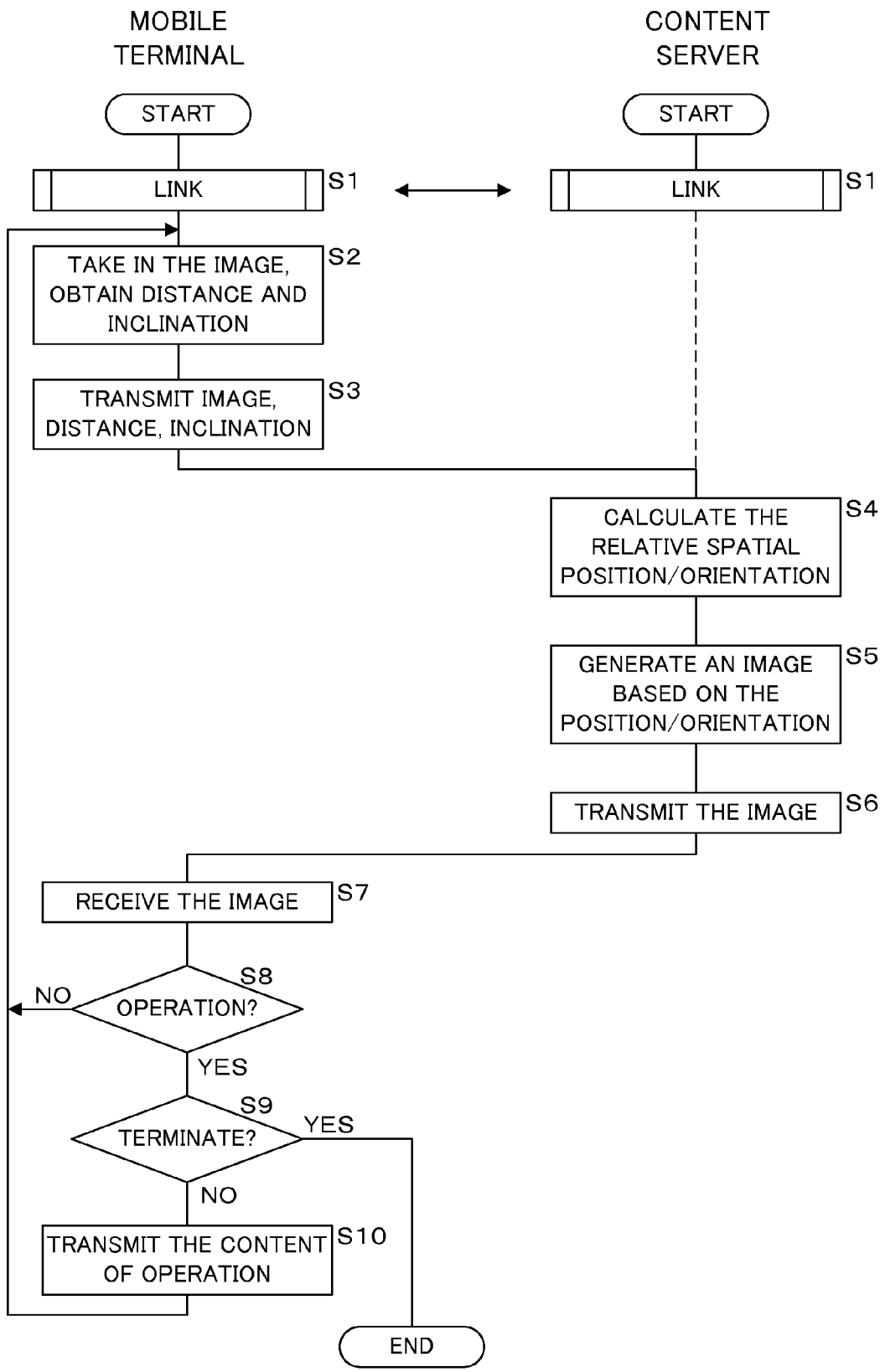
FIG. 5 is a flowchart illustrating an operation procedure of an information providing system.
Figure 6:
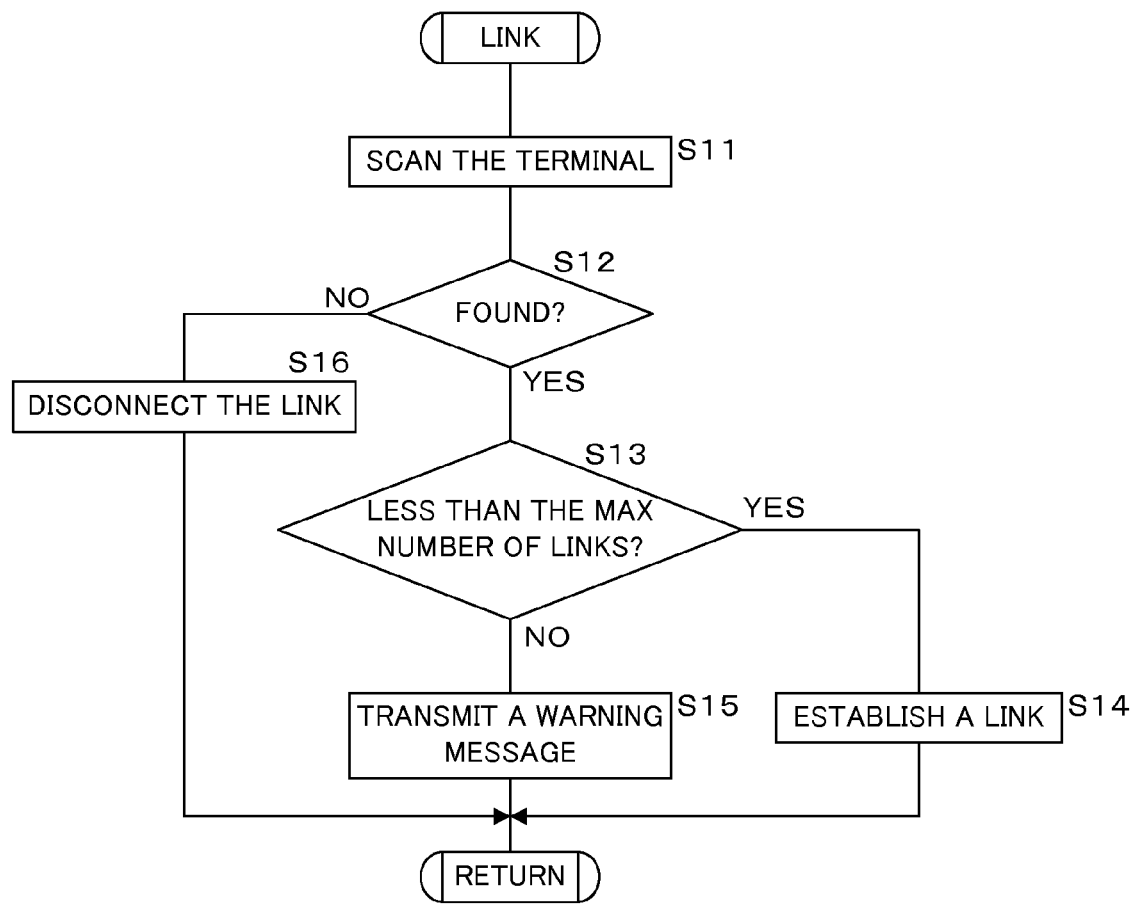
FIG. 6 is a flowchart illustrating a procedure of establishing a communication link between a content server and a mobile terminal.

Next, the operation of the information providing system is described. It is assumed in the present embodiment that the content server 1 and mobile terminal 3 perform wireless communication. FIG. 5 is a flowchart illustrating an operation procedure of the information providing system. FIG. 6 is a flowchart illustrating a procedure of establishing a communication link between the content server 1 and the mobile terminal 3. First, the content server 1 and the mobile terminal 3 establish a communication link (step S1). Referring now to FIG. 6, the CPU 11a of the content server 1 outputs a command for scanning the mobile terminal 3 (step S11). The CPU 11a determines whether or not the mobile terminal 3 is found based on the presence or absence of a response from the mobile terminal 3 (step S12). If the response from the mobile terminal 3 is present and the mobile terminal 3 is found (YES at step S12), the CPU 11a checks if the number of mobile terminals currently establishing a link is less than the maximum possible number of links (step S13). If the number is less than the maximum possible number of links (YES at step S13), the CPU 11a establishes a link with the mobile terminal 3 (step S14) and terminates the processing. If the number reaches the maximum possible number of links (NO at step S13), the CPU 11a transmits a warning message to the mobile terminal 3 (step S15), and terminates the processing. The warning message to be displayed on the mobile terminal 3 is, for example, "We are sorry. The maximum accessible number of persons is xx. Please wait a moment." If the response from the mobile terminal 3 is absent and the mobile terminal 3 is not found (NO at step S12), the CPU 11a disconnects the link (step S16) and terminates the processing. The CPU 11a executes the processing illustrated in FIG. 6 at predetermined intervals, e.g., every five seconds. It is noted that the processing may be returned to step S11, though it is terminated after any of steps S14 to S16 here. In such a case, the processing illustrated in FIG. 6 operates at backend so that the CPU 11a is able to execute other processing.

Referring back to FIG. 5, the user holds the mobile terminal 3 over the display 2, and photographs an image of a gazed portion among the information displayed on the display 2 with the camera module 32a. The CPU 31a of the mobile terminal 3 controls the camera module 32a to take in the image, while obtaining the distance between the mobile terminal 3 and the display 2 from the operation result of the AF mechanism 32b at the time of taking in the image. The CPU 31a (calculation part) also calculates the inclination of the mobile terminal 3 based on the measurement result obtained by the acceleration sensor 33 (step S2).

The CPU 31a of the mobile terminal 3 transmits the obtained image and distance as well as the calculated inclination to the content server 1 (step S3). The CPU 11a (detection part) of the content server 1 detects the position of the received image in the image displayed on the display 2 based on the image, distance and inclination received from the mobile terminal 3. Based on the detected position, the CPU 11a calculates the position and orientation (relative spatial position/orientation) of the mobile terminal 3 with respect to the display 2 (step S4). The CPU 11a specifies the area of the image to be transmitted to the mobile terminal 3 based on the calculated position/orientation. The CPU 11a (specifying part) specifies information corresponding to the area. The CPU 11a (reading part) reads out the specified information from the content database 12, and makes the image processing part 13 generate an image (step S5). The CPU 11a transmits the generated image to the mobile terminal 3 (step S6).

It is not essential for the mobile terminal 3 to have the acceleration sensor 33. In the case where the mobile terminal 3 is not provided with the acceleration sensor 33, the inclination of the mobile terminal 3 may be calculated by conducting rotation vector operation of images based on the image received by the mobile terminal 3 and the image displayed on the display 2.

The CPU 31a of the mobile terminal 3 receives an image from the content server 1 (step S7). The CPU 31a displays the received image on the display part 34, and waits for operation from the user (step S8). If the user performs any operation (YES at step S8), the CPU 31a determines whether it is a terminating operation (step S9). If it is the terminating operation (YES at step S9), the CPU 31a establishes a communication link or the like with the content server 1, and terminates the processing. If the operation is not the terminating operation (NO at step S9), the CPU 31a transmits the content of operation to the content server 1 (step S10), and returns the processing to step S2. If the operation from the user is not performed after a predetermined time has elapsed (NO at step S8), the CPU 31a returns the processing to step S2. Thereafter, step S2 and the subsequent steps are repeated. The basic operation of the information providing system is as described above.

Figure 7:
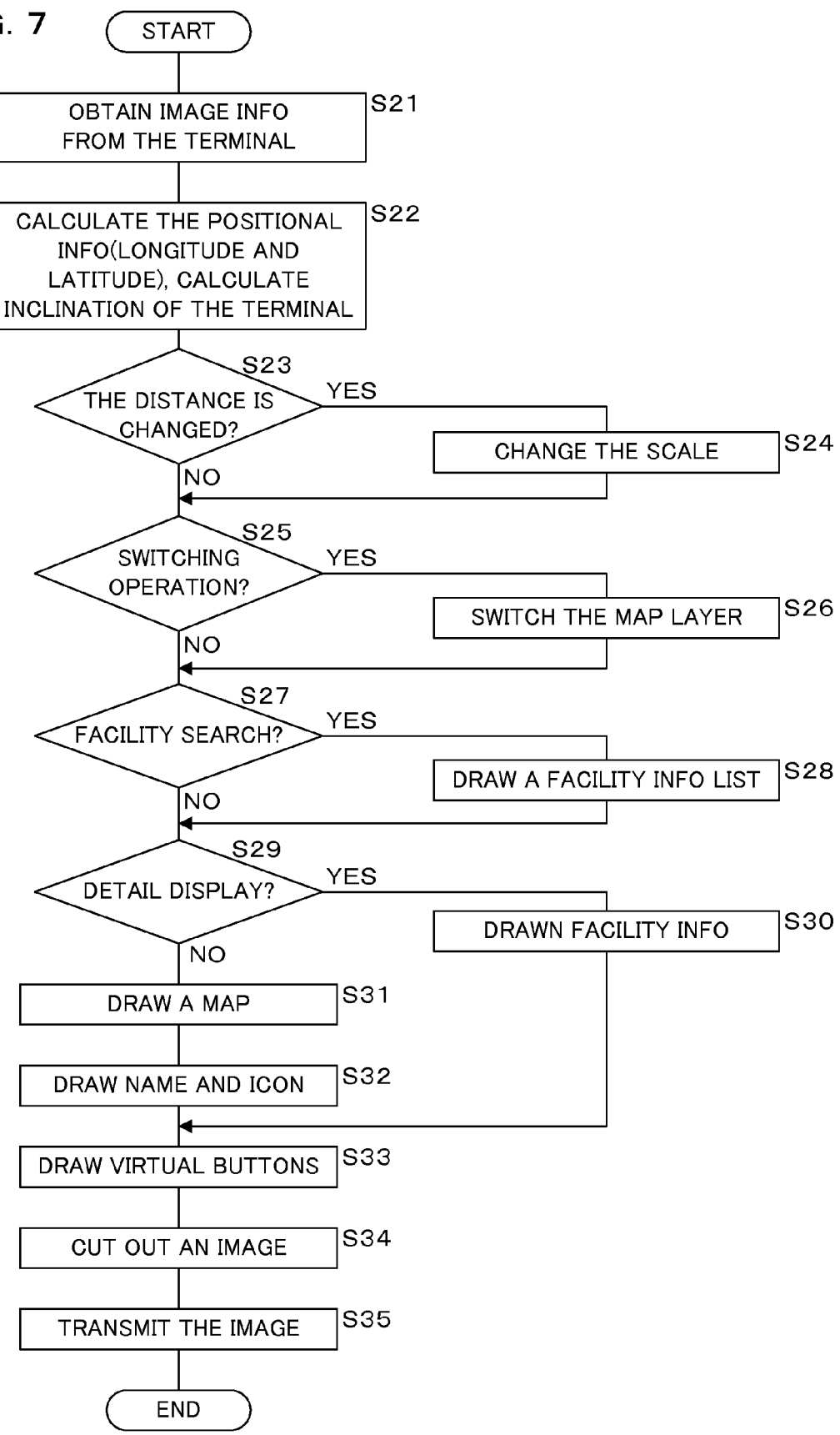
FIG. 7 is a flowchart illustrating a processing procedure for distributing a map.

Description will now be made for the operation of the information providing system in the case where the content to be provided is a map. It is assumed in the description below that the mobile terminal 3 does not have the acceleration sensor 33. FIG. 7 is a flowchart illustrating a processing procedure for distributing a map. The CPU 11a of the content server 1 obtains image information from the mobile terminal 3 (step S21). The CPU 11a compares the obtained image information with the map information being displayed on the display 2, to obtain the positional information (longitude and latitude) of the obtained image information as well as the inclination of the mobile terminal 3 (step S22). As the obtained image information is a part of the image displayed on the display 2, it is possible to find which part of the image displayed on the display 2 corresponds to the obtained image information by image matching. This allows the user to find the positional information (longitude and latitude) of the obtained image information and the inclination of the mobile terminal 3.

Next, the CPU 11a checks whether the distance between the mobile terminal 3 and the display 2 is changed (step S23). It is assumed here that the CPU 11a obtains the distance between the mobile terminal 3 which is communicating with the CPU 11a and the display 2, together with the image information, from the mobile terminal 3 and stores it in the RAM 11b or the like for each mobile terminal 3. The distance between the mobile terminal 3 and the display 2 is to be calculated by the CPU 31a based on the focal distance obtained when the AF mechanism 32b which is built in the mobile terminal 3 brings the lens into focus.

The CPU 11a compares the distance between the mobile terminal 3 and the display 2 obtained together with the image information, with the previous distance stored in the RAM 11b or the like, and determines whether or not the distance is changed. If the distance is changed (YES at step S23), the CPU 11a proceeds to step S24. In accordance with the amount of change, the CPU 11a changes the scale of the map to be transmitted to the mobile terminal 3. If the distance is not changed (NO at step S23), the CPU 11a proceeds to step S25.

The CPU 11a determines whether or not a switching operation is performed (step S25). The switching operation here means that the layer being displayed is switched not to be displayed, or the layer not being displayed is switched to be displayed. Such an operation signal is assumed to be transmitted from the mobile terminal 3 to the content server 1 separately from the image information.

If the switching operation is performed (YES at step S25), the CPU 11a proceeds to step S26. The CPU 11a switches between display/non-display of the corresponding map layer (step S26). If no switching operation is performed (NO at step S25), the CPU 11a returns the processing to step S27.

The CPU 11a determines whether or not a facility searching operation is performed (step S27). The facility searching operation means, for example, an operation of displaying a list of information on facilities included in the displayed area of the map. If the facility searching operation is performed (YES at step S27), the CPU 11a proceeds to step S28. The CPU 11a obtains facilities included in the displayed area of the map being displayed on the mobile terminal 3 by a spatial search. The image of the facility information list is drawn based on the search result (step S28). If the facility searching operation is not performed (NO at step S27), the CPU 11a proceeds to step S29.

The CPU 11a determines whether or not a detail displaying operation is performed (step S29). The detail displaying operation means an operation for displaying detailed information of a selected facility. For example, it is performed when the facility information displayed in a list is selected or when a facility icon on the map is selected. If the detail displaying operation is performed (YES at step S29), the CPU 11a draws the image of the selected facility information (step S30). The CPU 11a proceeds to step S33. If the detail displaying operation is not performed (NO at step S29), the CPU 11a proceeds to step S31.

The CPU 11a draws the image of a map in the selected area at a currently-selected scale (step S31). The CPU 11a draws, on a map, the image of a name and an icon of the facility information within the displayed area of the map and has a display starting scale smaller than the currently-selected scale (step S32).

The CPU 11a draws the image of a virtual button (facility search button, layer switching menu or the like) corresponding to the currently-displayed content at a part of an image (step S33). The CPU 11a cuts out an image according to the inclination of the mobile terminal 3 from the image created by the processing as described above (step S34). The CPU 11a transmits the cut-out image to the mobile terminal 3 (step S35). The CPU 11a terminates the processing. Thereafter, when an image is transmitted again from the mobile terminal 3, the CPU 11a performs the processing from S21 again.

Figure 8:
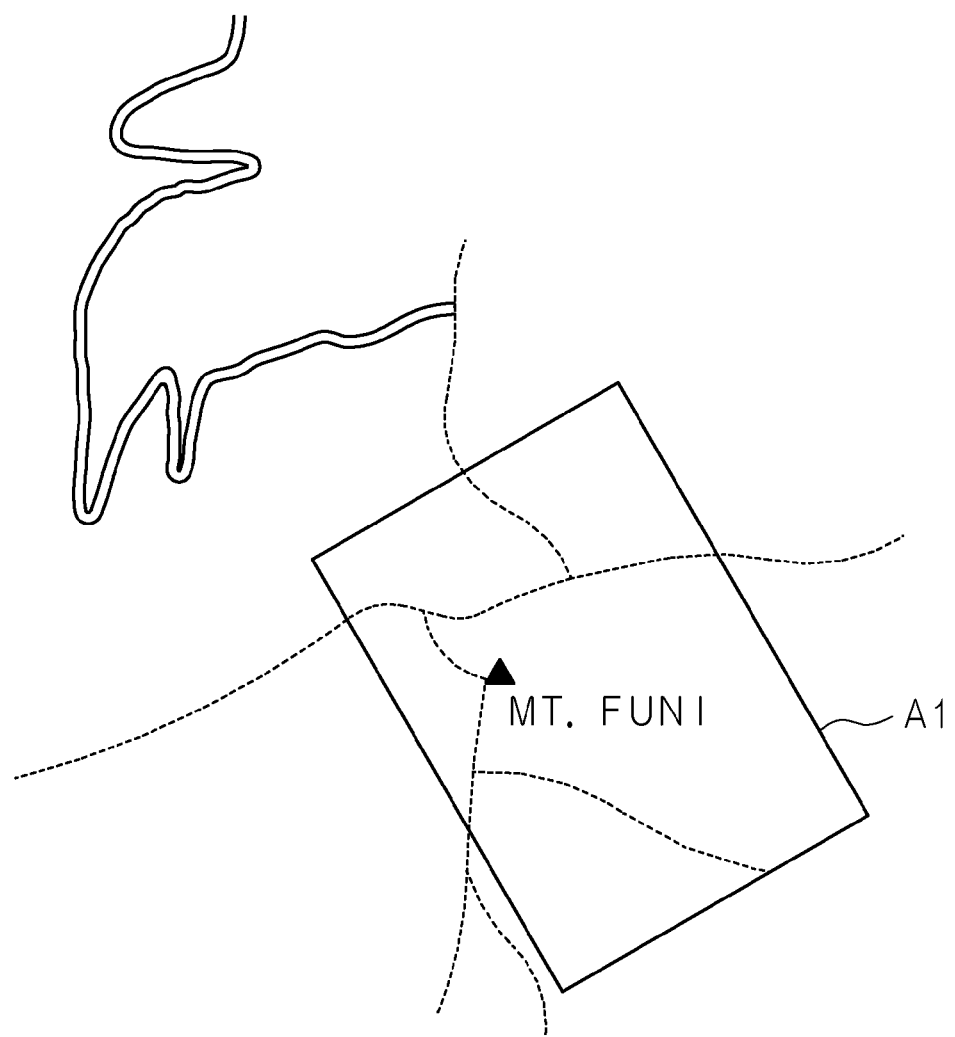
FIG. 8 is an explanatory view illustrating an example of a map shown on a display.

Next, the processing as mentioned above is described based on a specific example. FIG. 8 is an explanatory view illustrating an example of a map displayed on the display 2. The rectangular frame drawn on the map corresponds to an area photographed by the user with a camera. The CPU 31a of the mobile terminal 3 causes the camera module 32a to photograph the area of the rectangular frame in accordance with user's operation, and transmits the image to the content server 1 using the communication part 36. The CPU 31a may also transmit to the content server 1 the focal distance obtained when the AF mechanism 32b brings the lens into focus as well as the inclination of the terminal obtained by the acceleration sensor 33.

Figure 9:
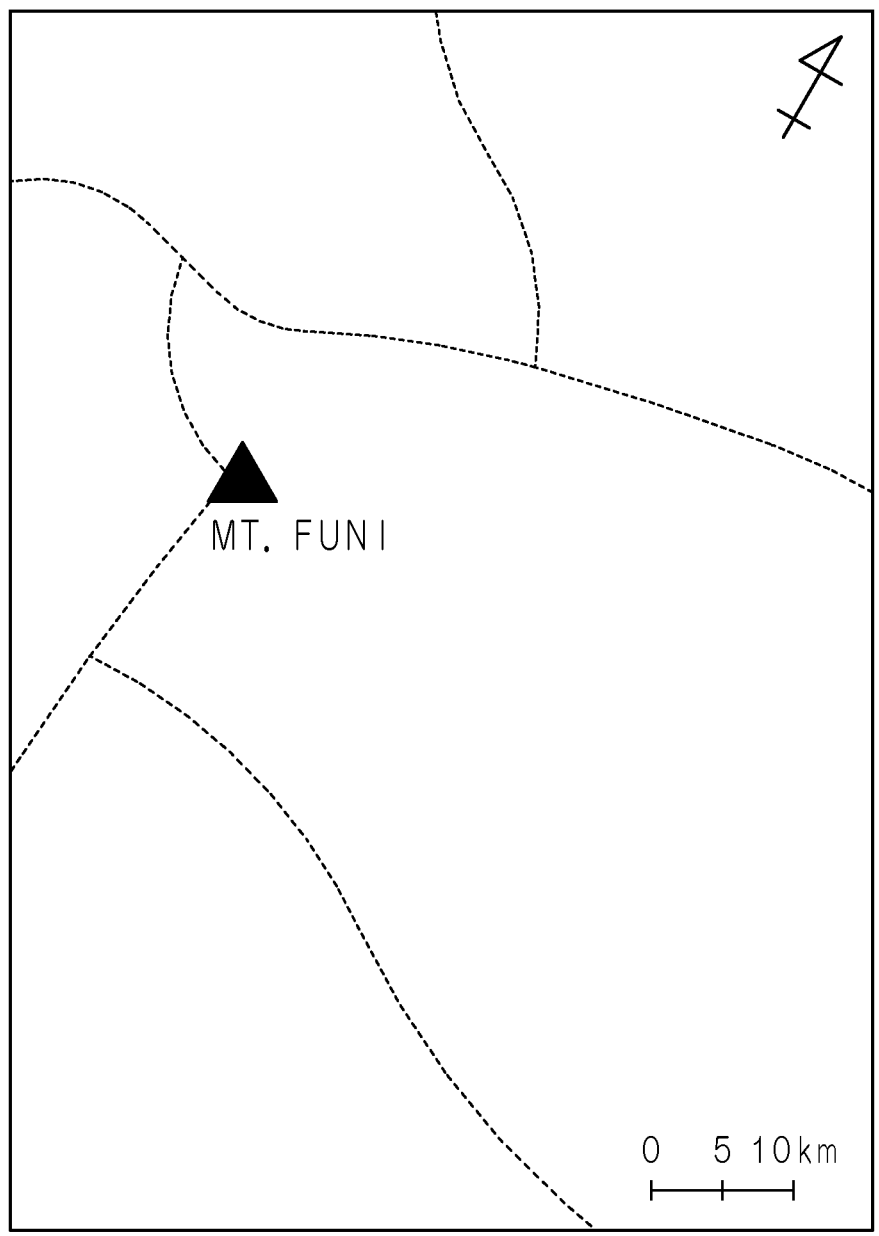
FIG. 9 is an explanatory view illustrating an example of a map displayed on a mobile terminal.

The CPU 11a of the content server 1 calculates the position (latitude and longitude) and the inclination of the image transmitted from the mobile terminal 3 based on the received image (step S22). In accordance with the calculated position of the image and the calculated inclination of the terminal, the CPU 11a cuts out an image (step S34), and transmits the image to the mobile terminal 3 (step S35). FIG. 9 is an explanatory view illustrating an example of a map displayed on a mobile terminal 3. The region of the rectangular frame illustrated in FIG. 8 is displayed on the display part 34 of the mobile terminal 3.

Figure 10:
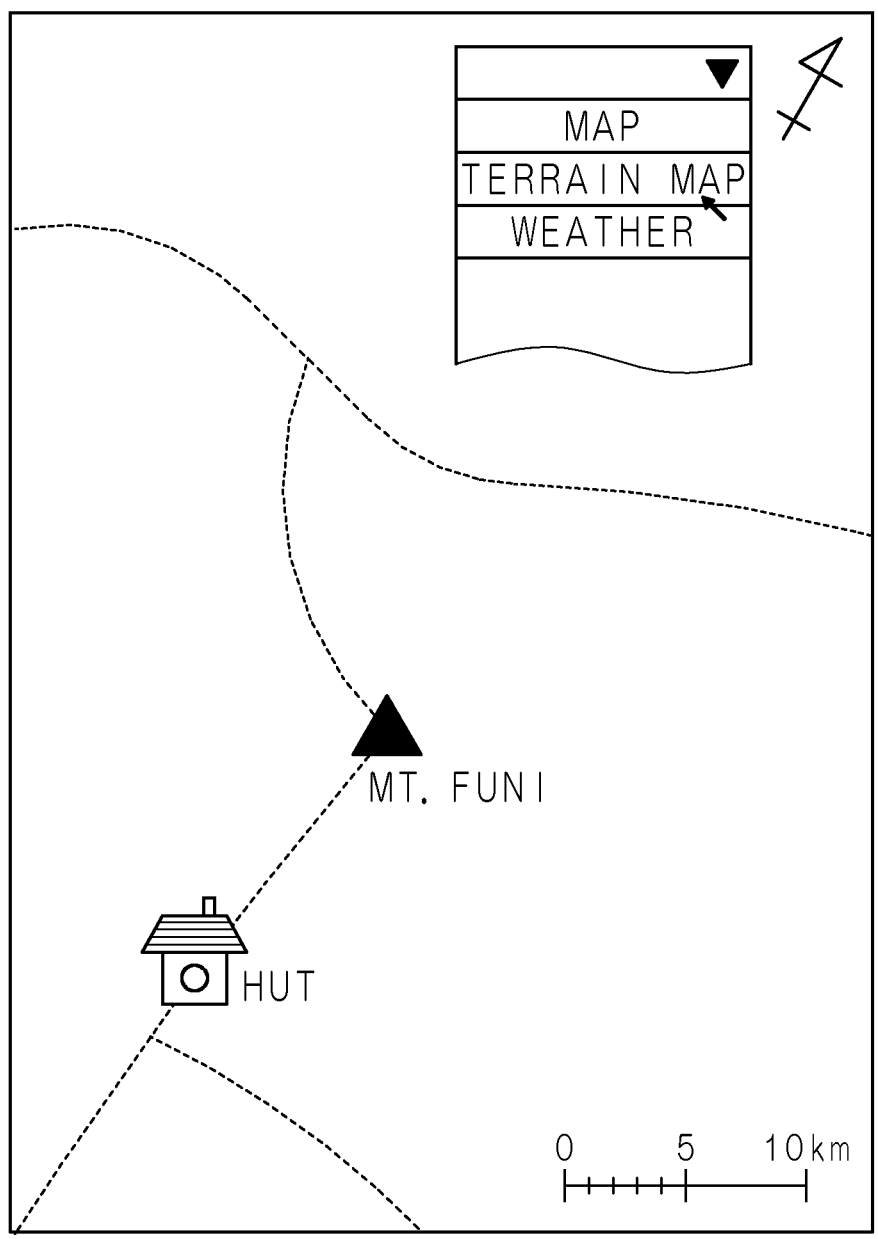
FIG. 10 is an explanatory view illustrating another example of a map displayed on a mobile terminal.

FIG. 10 is an explanatory view illustrating another example of a map displayed on the mobile terminal 3. This example is an assumption of the case where the user moves the mobile terminal 3 closer to the display 2 with the image of Mt. Funi coming to the middle part of the screen while the image of FIG. 9 is being displayed on the display part 34 of the mobile terminal 3. Comparing FIG. 9 with FIG. 10, the map illustrated in FIG. 10 has a larger scale than the map illustrated in FIG. 9. Moreover, Mt. Funi is displayed around the middle of the map. Furthermore, the increased scale reaches the scale larger than the display starting scale of a mountain lodge, the mountain lodge is displayed on the map. That is, the CPU 11a of the content server 1 detects that the distance to the display 2 is changed (YES at step S23), and changes the scale of the map being displayed (step S24).

Figure 11:
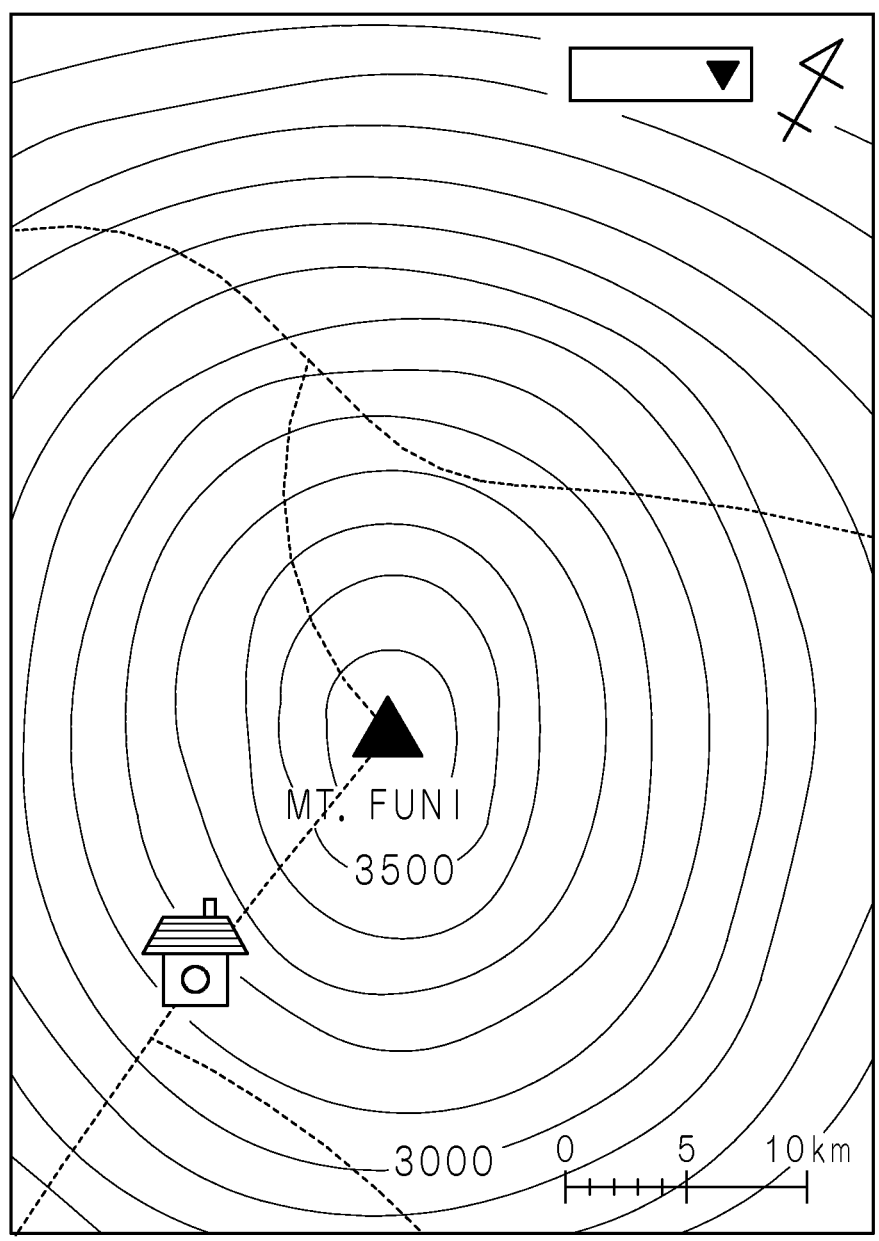
FIG. 11 is an explanatory view illustrating an example of a map in the case where a terrain layer is displayed.

FIG. 10 further displays an example of a menu for layer switching. Here, a checked layer is to be displayed. When the terrain is selected which is not displayed, the screen illustrated in FIG. 11 is displayed. FIG. 11 is an explanatory view illustrating an example of a map in the case where a terrain layer is displayed. Though the displayed area is similar to that in FIG. 10, contour lines are additionally displayed. The CPU 11a detects the operation of switching layers (step S25), and switches the selected terrain layer from non-display to display (step S26).

While the description above indicated that the layer switching menu is displayed on the screen in advance, it is not limited thereto. The layer switching menu may also be displayed when the user presses down a specific button at the operation part 35 of the mobile terminal 3.

Figure 12:
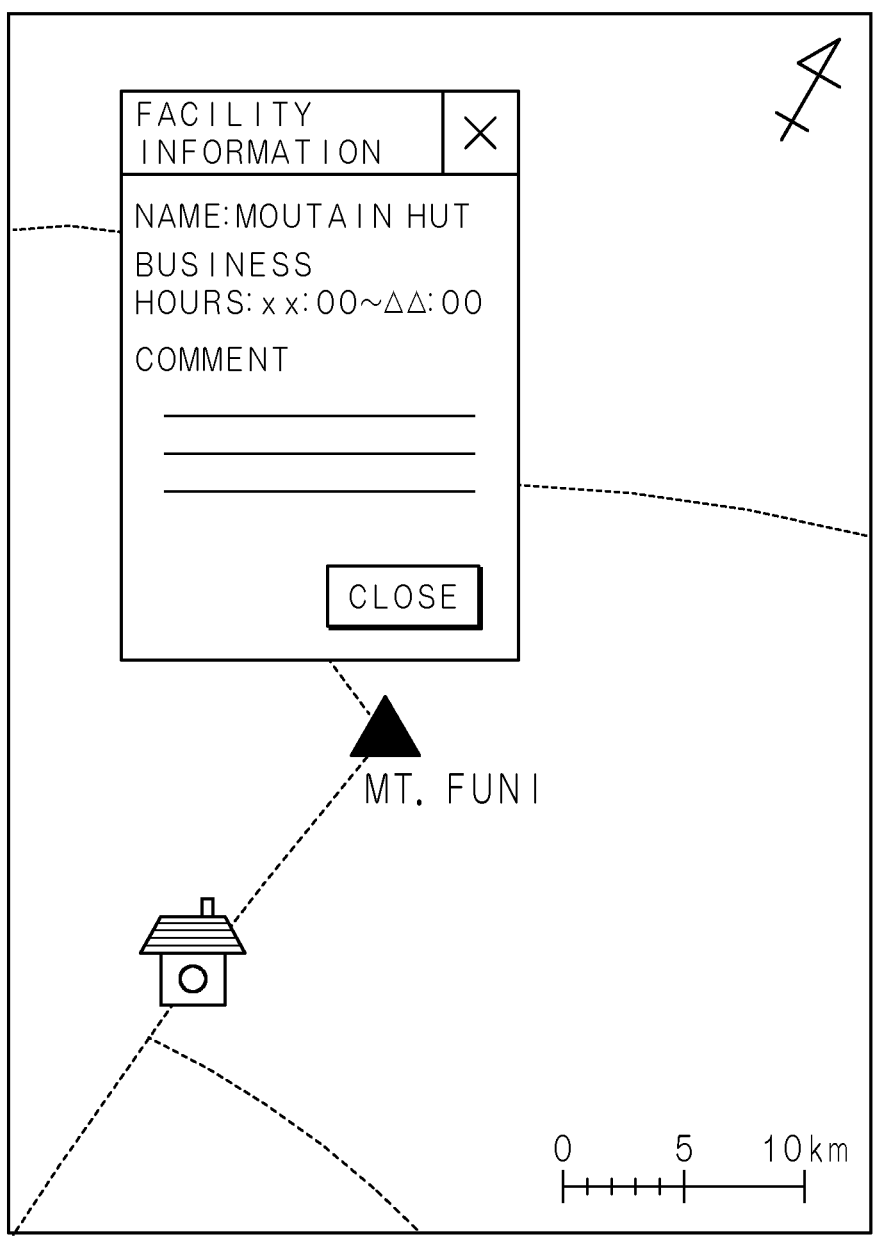
FIG. 12 is an explanatory view illustrating an example of a screen in the case where facility information is displayed.

FIG. 12 is an explanatory view illustrating an example of a screen in the case where facility information is displayed. In FIG. 10, when the user selects the icon of the mountain lodge, the CPU 11a of the content server 1 detects that the detail display operation is performed (YES at step S29), reads out information related to the mountain lodge from the fields of facility name, business hours and comments in the content database 12, and draws the image of the content (step S30).

Figure 13:
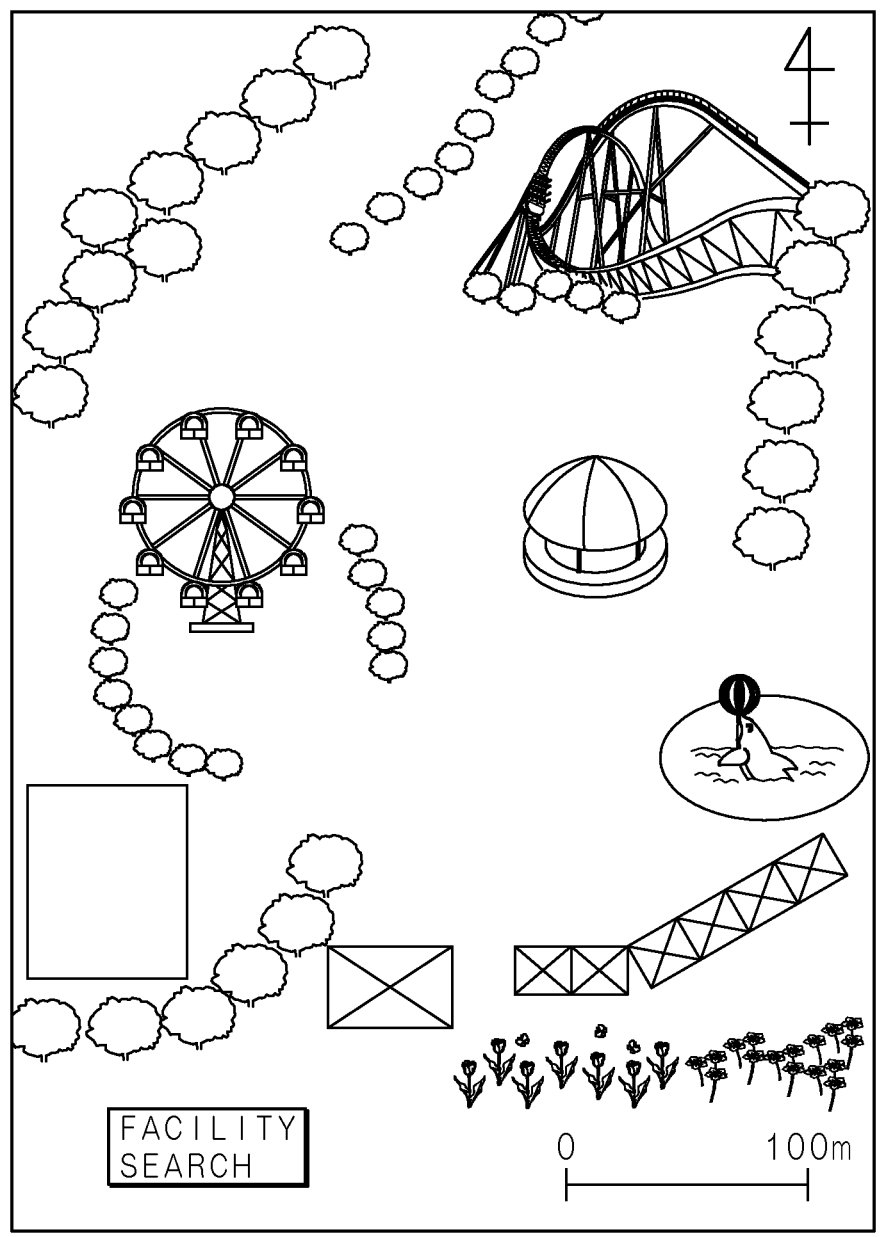
FIG. 13 is an explanatory view illustrating another example of a map displayed on a mobile terminal.
Figure 14:
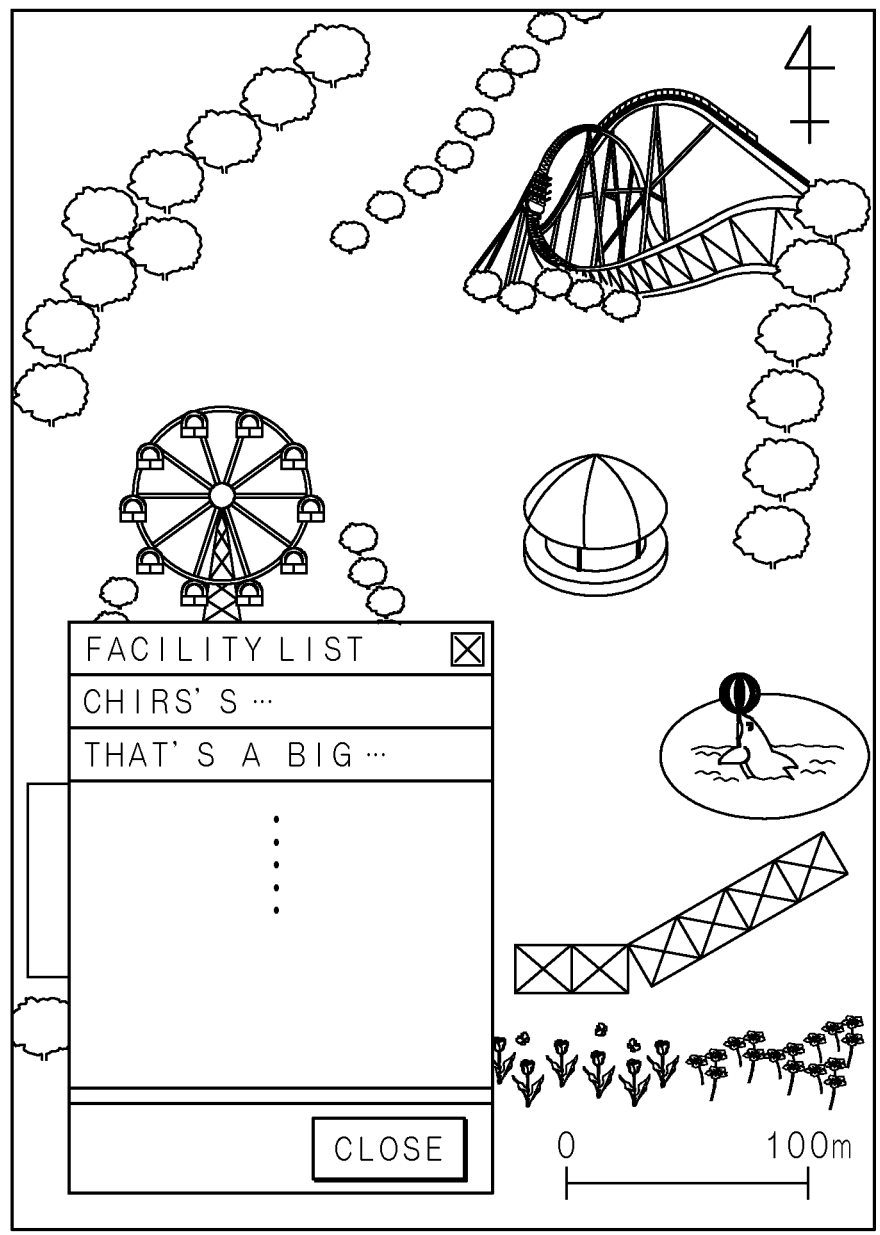
FIG. 14 is an explanatory view illustrating an example of a screen on which a list of facility information is displayed.

FIG. 13 is an explanatory view illustrating another example of a map displayed on the mobile terminal 3. This example includes a number of facilities on, for example, a map of a theme park. When the user selects the facility search button, the CPU 11a of the content server 1 detects the facility searching operation (YES at step S27), and searches for the facility in the displayed area of the map. For example, the CPU 11a obtains values of the latitude and longitude for each of the four corners of the map. The CPU 11a compares the values with the latitude and longitude of each record of the facility information d2 in the content database 12, and extracts a record included in the displayed area. The CPU 11a displays a list of facility names as a search result. FIG. 14 is an explanatory view illustrating an example of a screen on which a list of facility information is displayed. On the map screen, a window for the list of facilities is displayed, in which the names of the facilities included in the displayed area of the map are indicated.

Though, in the description above, the processing in the case of multiple mobile terminals is not particularly described, the processing described above may also be performed similarly for each of multiple mobile terminals when the content server 1 is linked with the multiple mobile terminals.

As described above, in the present embodiment, it is possible for the content server 1 to detect the position designated by the user based on the image photographed and transmitted by the mobile terminal 3, and to transmit the information according to the position to the mobile terminal 3 of the user.

While the description above is made on the assumption that the map data is raster data, it may also be vector data, not limited to raster data. In the case of vector data, the image to be displayed on the mobile terminal 3 may be generated not by the content server 1 but by the mobile terminal 3. The content server 1 transmits map data required for display to the mobile terminal 3, and the mobile terminal 3 uses the received map data to generate an image.

Embodiment 2

Figure 15A:
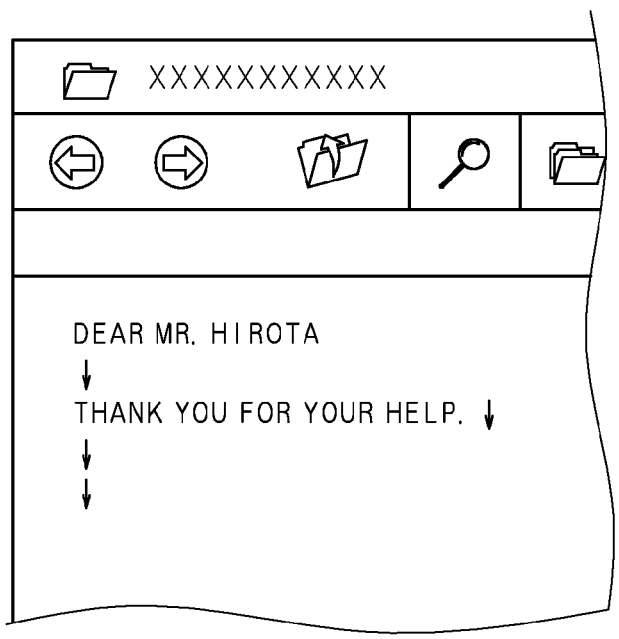
FIG. 15A is an explanatory view for the use as a magnifying glass.
Figure 15B:
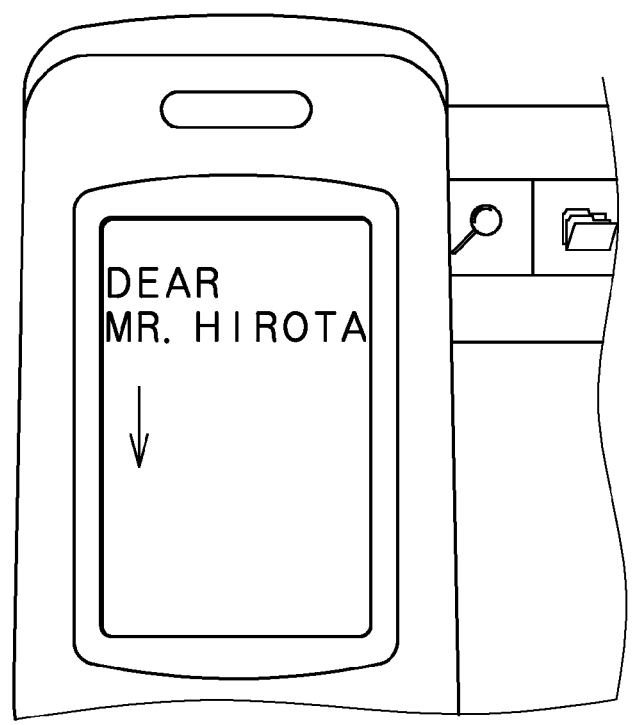
FIG. 15B is an explanatory view for the use as a magnifying glass.

In Embodiment 2, the use as a magnifying glass is described. FIG. 15A and FIG. 15B are explanatory views for the use as a magnifying glass. FIG. 15A illustrates an example of characters displayed on the display 2. FIG. 15B is an example where the characters shown in FIG. 15A are enlarged for display. Since the first Chinese character shown in FIG. 15A is hard to be read because it has many strokes, the user holds the mobile terminal 3 over the display 2 to magnify the character.

Figure 16:
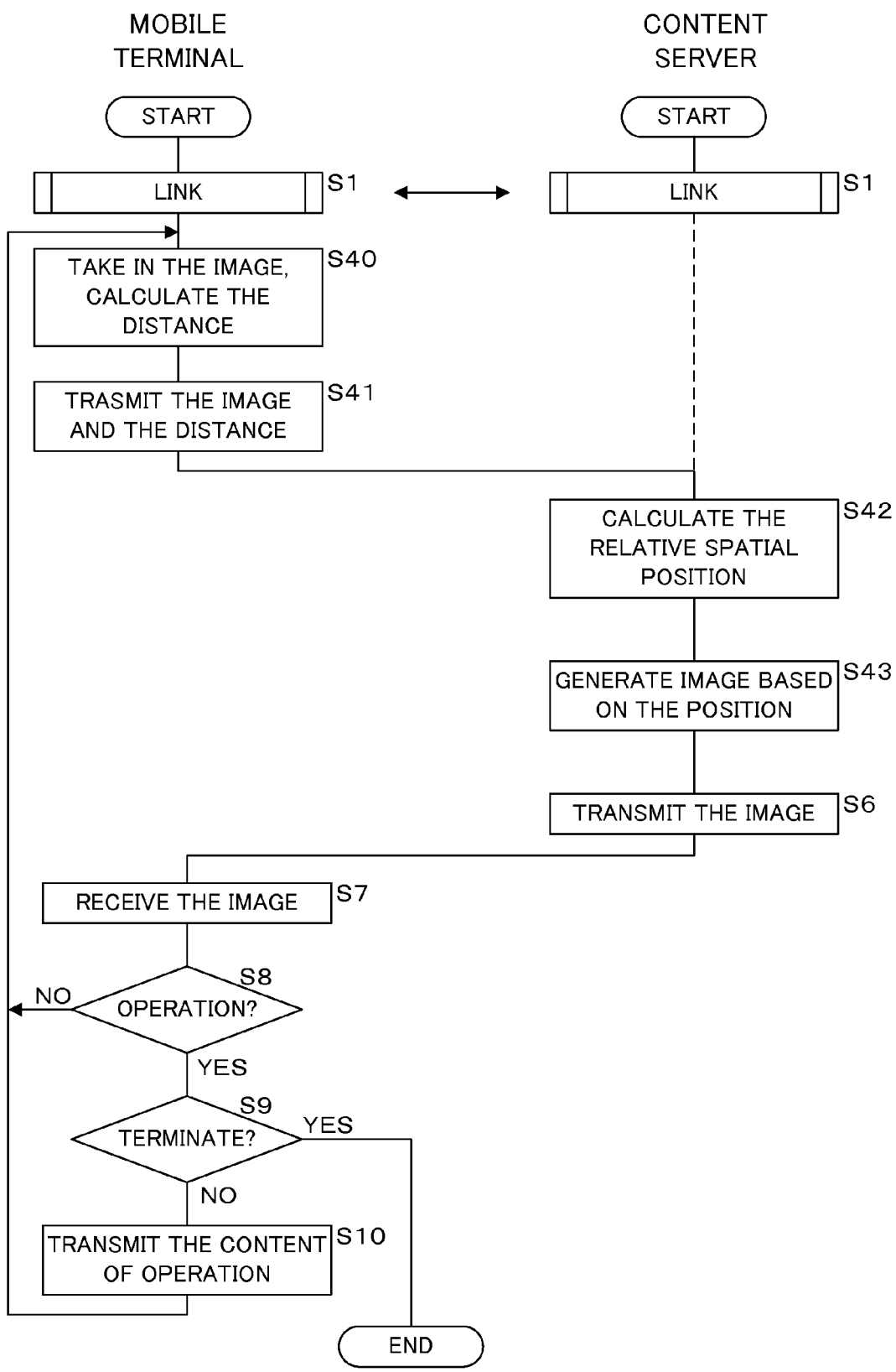
FIG. 16 is a flowchart illustrating an operation procedure of an information providing system.

FIG. 16 is a flowchart illustrating an operation procedure of an information providing system. The CPU 31a of the mobile terminal 3 controls the communication part 36 to establish a link with the content server 1 (step S1). The user holds the mobile terminal 3 over the display 2, and photographs the part he/she wishes to enlarge with the camera module 32a. The CPU 31a takes in the image from the camera module 32a while calculating the distance between the mobile terminal 3 and the display 3 based on the focal distance obtained by the AF mechanism 32b (step S40). The CPU 31a transmits the image and the distance to the content server 1 (step S41). The CPU 11a of the content server 1 finds the position at which the mobile terminal 3 photographed the display 2, i.e., which part of the display 2 was photographed by the mobile terminal 3, based on the received image and distance (step S42). The CPU 11a causes the image processing part 13 to generate a partial image based on the found position (step S43). The CPU 11a transmits the generated image to the mobile terminal 3 (step S6).

The CPU 31a of the mobile terminal 3 receives an image and displays the image on the display part 34 (step S7). The CPU 31a monitors whether or not an operation is performed by the user for a predetermined period of time (step S8), and if an operation is performed (YES at step S8), the CPU 31a determines if the operation is a terminating operation (step S9). If it is the terminating operation (YES at step S9), the CPU 31a establishes a communication link or the like with the content server 1 and terminates the processing. If it is not the terminating operation (NO at step S9), the CPU 31a transmits the content of operation to the content server 1 (step S10), and returns the processing to step S40. If no operation is performed (NO at step S8), the CPU 31a returns the processing to step S40.

In the case of using as a magnifying glass, an image is enlarged when the mobile terminal 3 moves closer to the display 2 and is reduced when it moves away therefrom.

Since it may be possible that an enlarged character is hard to be seen if an output image is inclined, the mobile terminal 3 is configured not to measure inclination and not to transmit inclination to the content server 1. Whether to use inclination or not may be switched by the user, or may be decided by the CPU 31a of the mobile terminal 3 analyzing the content of the image. It is also possible for the content server 1 not to use the information of inclination received from the mobile terminal 3 when character information is shown on the display 2.

As described above, in the present embodiment, a part of the image being displayed on the display 2 is enlarged/reduced in size at an appropriate magnification ratio in accordance with the distance between the mobile terminal 3 and the display 2, so that the user may use the mobile terminal 3 as a magnifying glass. Especially when a character is enlarged, the processing of, for example, changing the font size allows the shape of the enlarged character to be maintained for display, which enables the user to clearly see even a Chinese character with many strokes without it being illegible.

Embodiment 3

Figure 17:
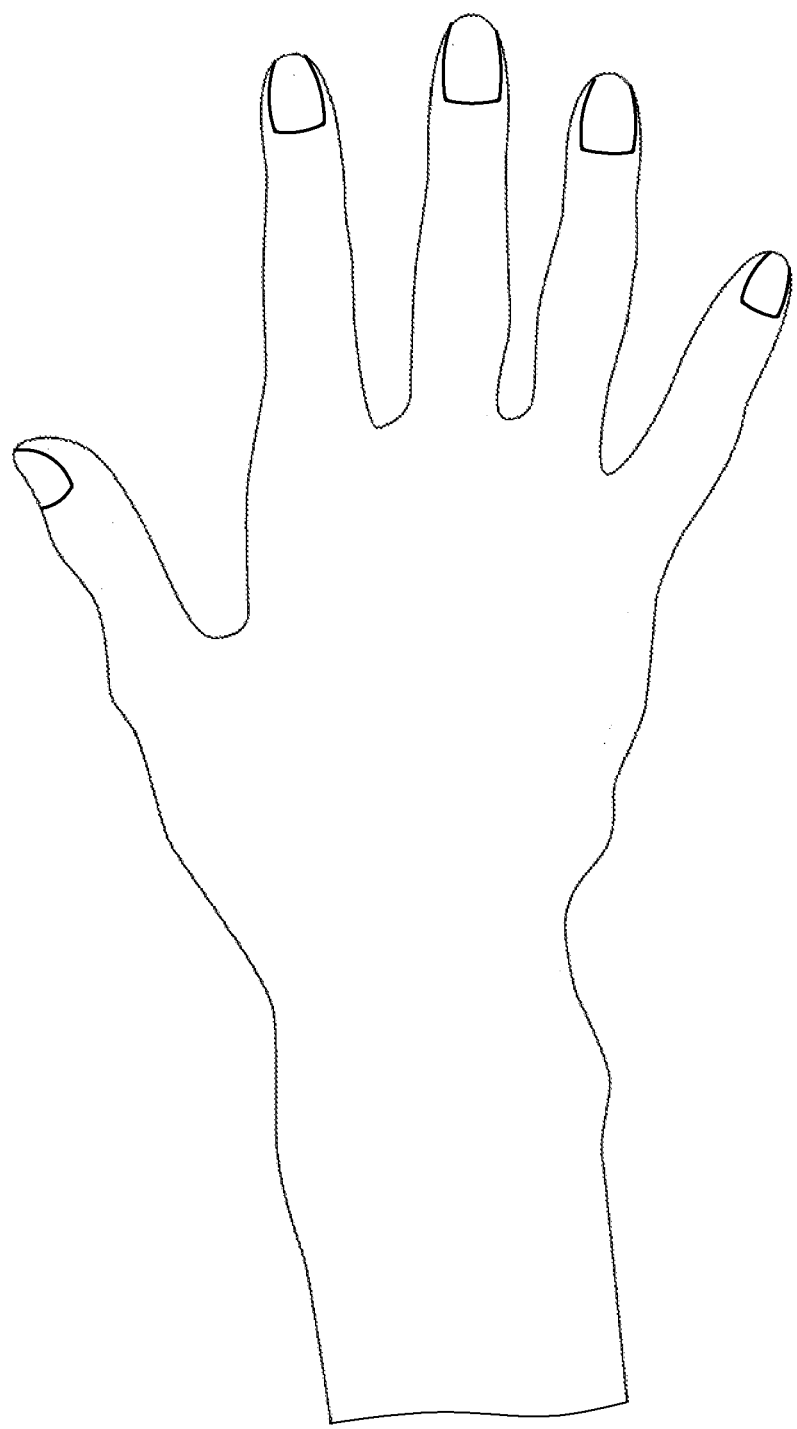
FIG. 17 is an explanatory view illustrating an example of an initial display.
Figure 18:
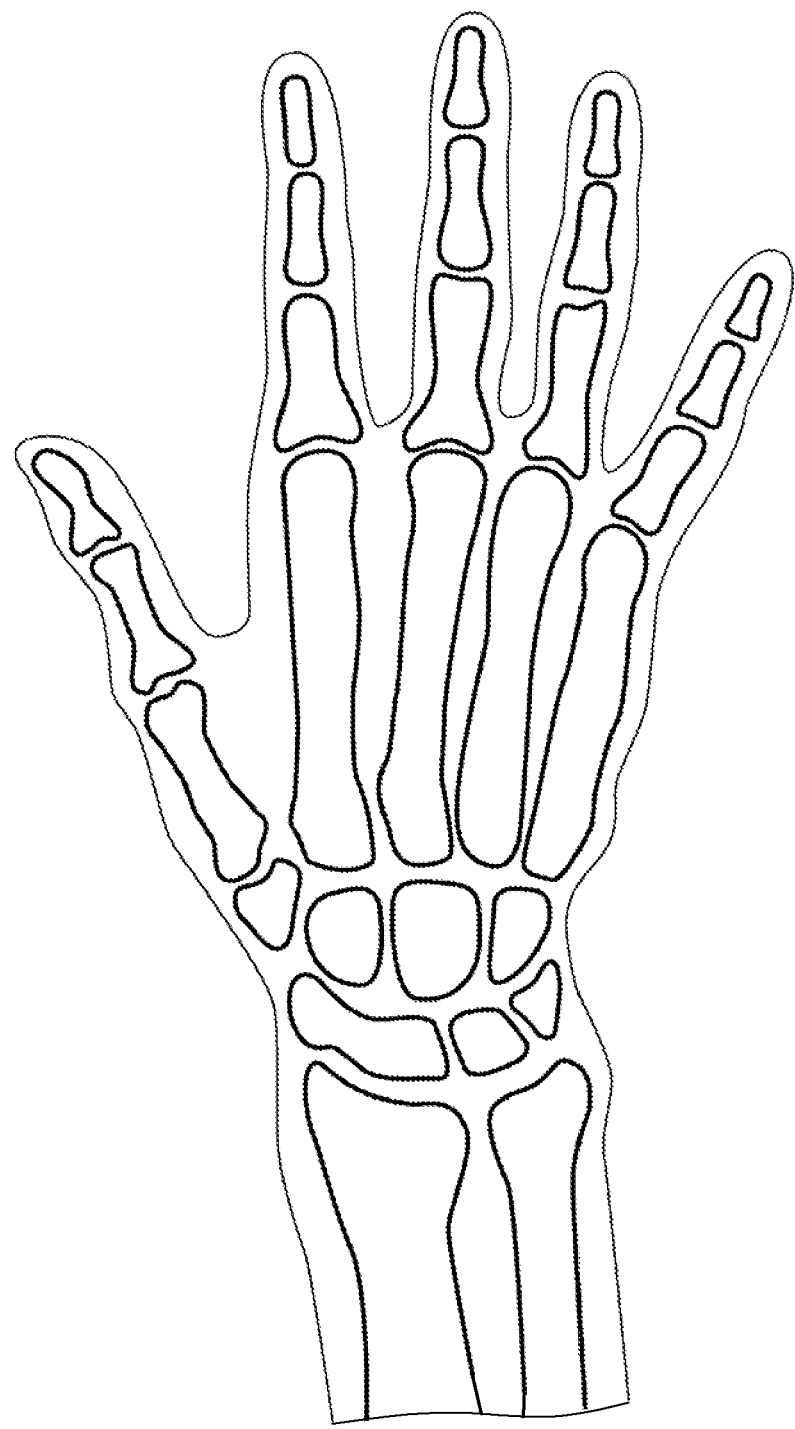
FIG. 18 is an explanatory view illustrating an example of an image displayed on a display part of a mobile terminal.

In the present embodiment, the content levels to be displayed are automatically switched. As an example, a pictorial book illustrating the structure of human body is described. FIG. 17 is an explanatory view illustrating an example of an initial display. The right hand part of a human body is normally displayed on the display 2. FIG. 18 is an explanatory view illustrating an example of an image displayed on the display part 34 of the mobile terminal 3. While the right hand of the human body illustrated in FIG. 17 is displayed, FIG. 18 shows the bones, not the skin. By holding the mobile terminal 3 over the display 2, the user virtually sees through the skin and views the bones. When the mobile terminal 3 moves closer to the display 2 in this state, the layer being displayed is automatically switched, such as to display blood vessels, not the bones. It is configured here that the enlargement/reduction of the image is performed by user's operation, not by the change in the distance between the mobile terminal 3 and the display 2. For example, enlargement/reduction of the image may be changed when a mechanical switch included in the operation part 35 or a virtual button displayed on the display part 34 is operated.

Figure 19:
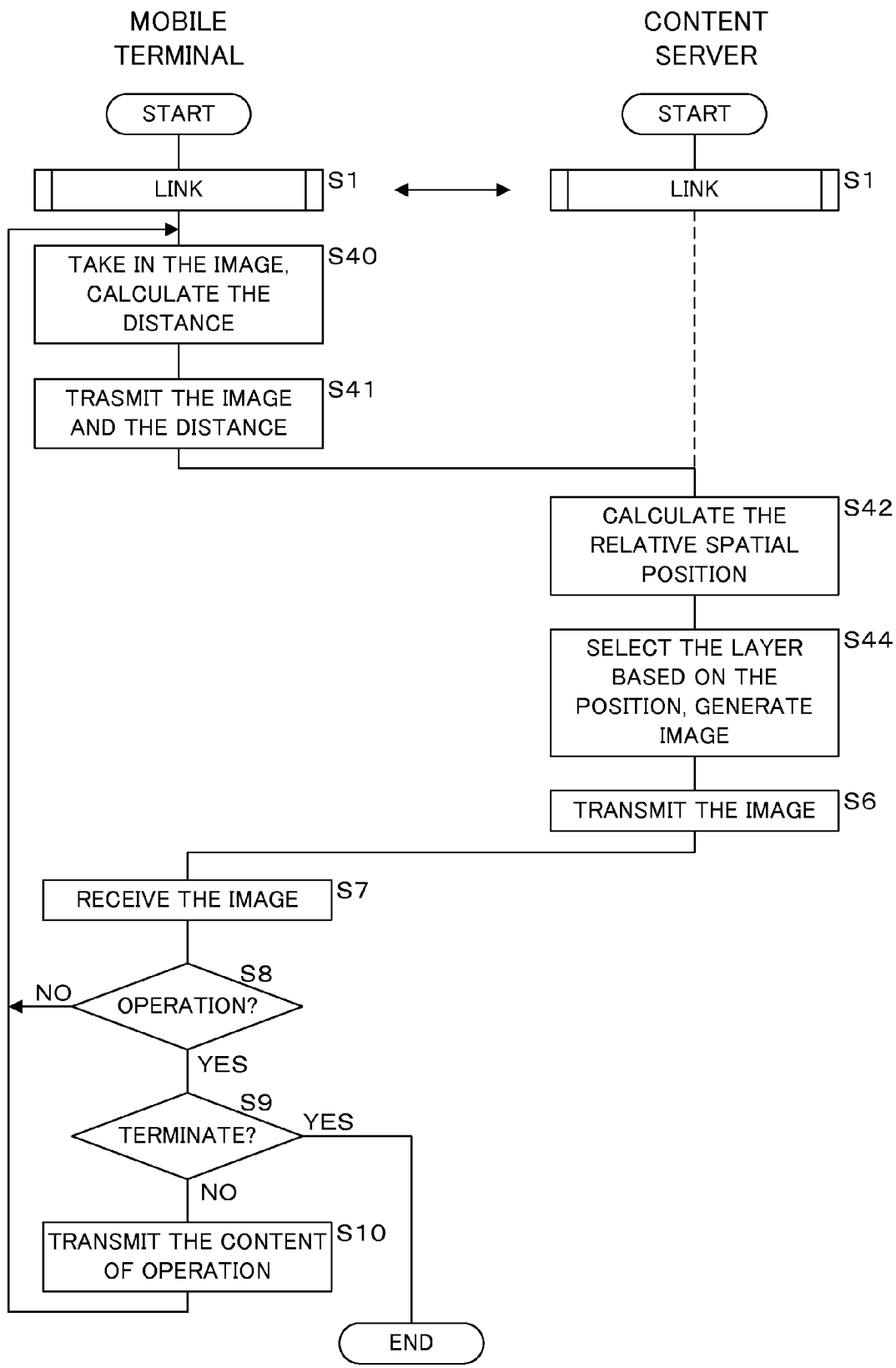
FIG. 19 is a flowchart illustrating an operation procedure of an information providing system.

FIG. 19 is a flowchart illustrating an operation procedure of an information providing system. The CPU 31a of the mobile terminal 3 controls the communication part 36 and establishes a link with the content server 1 (step S1). The user holds the mobile terminal 3 over the display 2, and photographs a part he/she wishes to view the internal structure thereof with the cameral module 32a. The CPU 31a takes in the image from the camera module 32a while calculating the distance between the mobile terminal 3 and the display 2 based on the focal distance obtained by the AF mechanism 32b (step S40). The CPU 31a transmits the image and distance to the content server 1 (step S41). The CPU 11a of the content server 1 finds the position at which the mobile terminal 3 photographed the display 2, i.e. which part of the display 2 the mobile terminal 3 photographed, based on the received image and distance (step S42). The CPU 11a selects a layer to be displayed based on the found position, and causes the image processing part 13 to generate an image to be transmitted to the mobile terminal 3 (step S44). In this example, the skin is not displayed whereas the blood vessels are displayed. The CPU 11a transmits the generated image to the mobile terminal 3 (step S6).

The CPU 31a of the mobile terminal 3 receives an image and displays the image on the display part 34 (step S7). The CPU 31a monitors if an operation from the user is not performed for a predetermined period of time (step S8), and if an operation is performed (YES at step S8), the CPU 31a determines whether the operation is a terminating operation (step S9). If it is the terminating operation (YES at step S9), the CPU 31a establishes, for example, a communication link with the content server 1, and terminates the processing. If it is not the terminating operation (NO at step S9), the CPU 31a transmits the content of operation to the content server 1 (step S10), and returns the processing to step S40. If no operation is performed (NO at step S8), the CPU 31a returns the processing to step S40. For example, the operation of the user corresponds to enlargement/reduction of an image.

As described above, in the present embodiment, the structure of a human body is expressed as hierarchical structure data as in a human body pictorial book, and sequentially switches between body parts, i.e. from the surface of a human body such as skin to the internal parts of the human body such as blood vessels, muscles, bones and the like, allowing the user to view the hierarchical structure data by intuitive operation.

Though the layer to be displayed is changed based on the distance between the mobile terminal 3 and the display 2, it is not limited thereto. The layer to be displayed may be fixed and an image may be enlarged/reduced based on the distance between the mobile terminal 3 and the display 2. In this case, it is possible to finely look at a specific layer.

Moreover, as the data handled by the present embodiment, a CT (Computed Tomography) image or an MRI (Magnetic Resonance Image) may also be employed. Here, the tomographic image to be displayed is changed based on the distance between the mobile terminal 3 and the display 2, so that more intuitive feeling of operation may be provided to the user.

Embodiment 4

Figure 20:
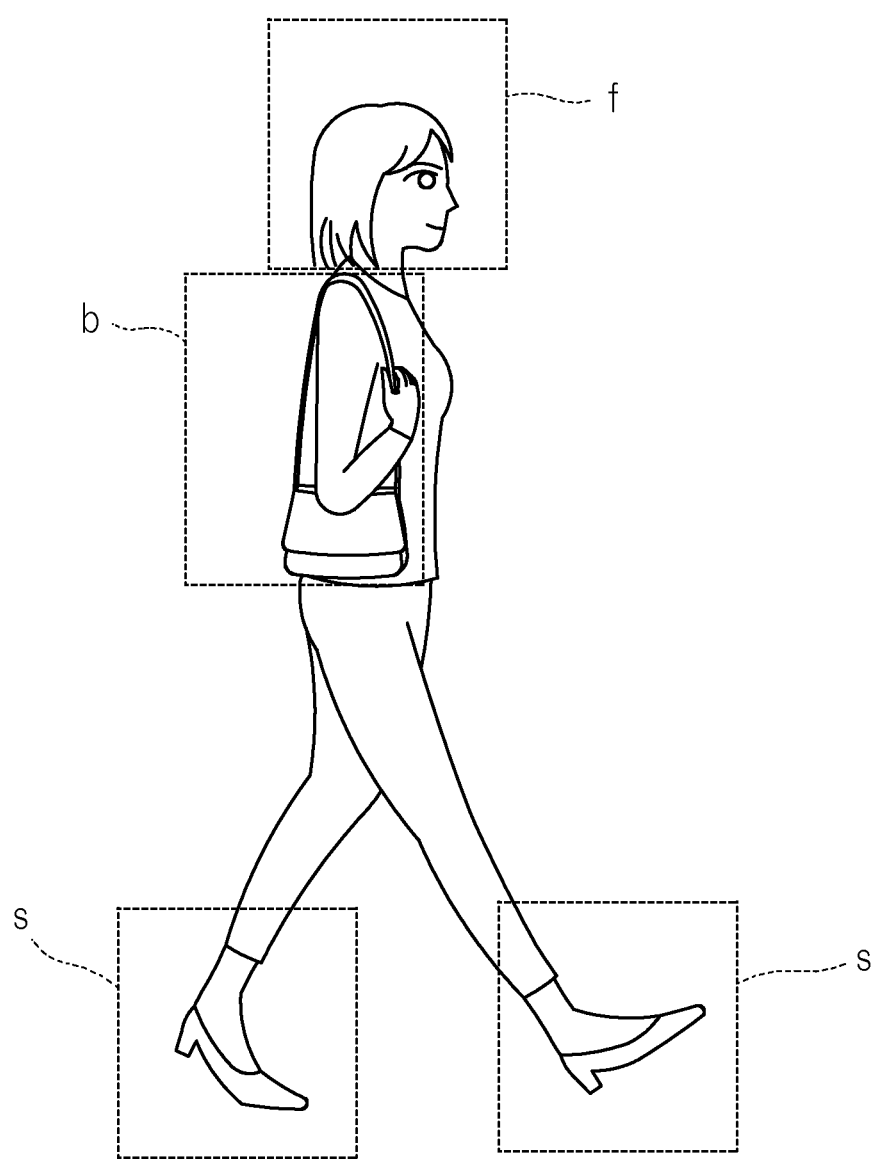
FIG. 20 is an explanatory view illustrating an example of an advertisement image shown on a display.

In the present embodiment, the use as a digital signage is described. FIG. 20 is an explanatory view illustrating an example of an advertisement image shown on the display 2. The image shows a woman walking while holding a purse over her shoulder. Links to advertisement are virtually pasted to parts of the image. In FIG. 20, the portions enclosed by quadrangles of dotted lines are the regions where links are pasted. The region f is set at the facial part of the woman. The region b is set at the purse part. The regions s are set at the parts of high heels.

Figure 21:
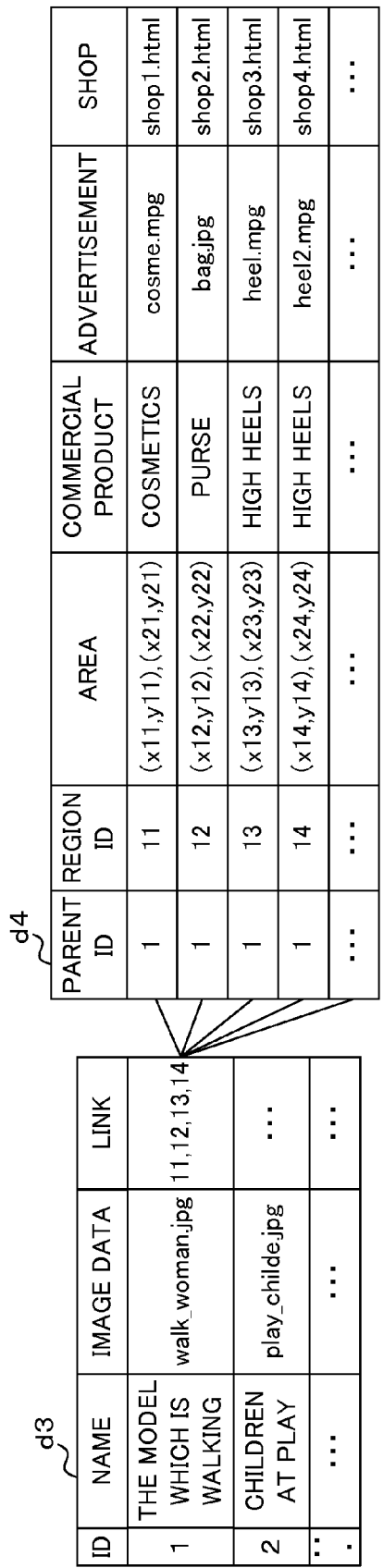
FIG. 21 is an explanatory view illustrating an example of a data structure of a content database.

FIG. 21 is an explanatory view illustrating an example of a data structure of a content database 12. The content database 12 includes image data d3 and advertisement contents d4. The image data d3 includes the fields of ID, name, image data and link. The advertisement contents d4 includes the fields of parent ID, region ID, area, commercial product, advertisement and shop. The ID field stores a main key for specifying a record. The name field stores a name of image data. The link field stores a region ID of the advertisement content d4 linked with image data. The parent ID field of the advertisement content d4 stores an ID of image data linked with the advertisement content d4. The region ID field stores an ID of the advertisement content d4. The area field stores coordinate data for defining which part of the image data d3 the advertisement content d4 is linked with. As each region has a rectangular shape in the present embodiment, coordinate values for two points on a diagonal line are stored. In the area field of the region ID 11, (x11, y11) and (x12, y21) are stored. The four coordinates constituting the region ID 11 are (x11, y11), (x21, y11) (x21, y21) and (x11, y21). The commercial product field stores the name of a product handled by the advertisement content d4. The advertisement field stores a file name of a video or still image which is an entity of the advertisement content d4.

The shop field stores a file name of shop guide data for a shop which sells the commercial product.

Figure 22:
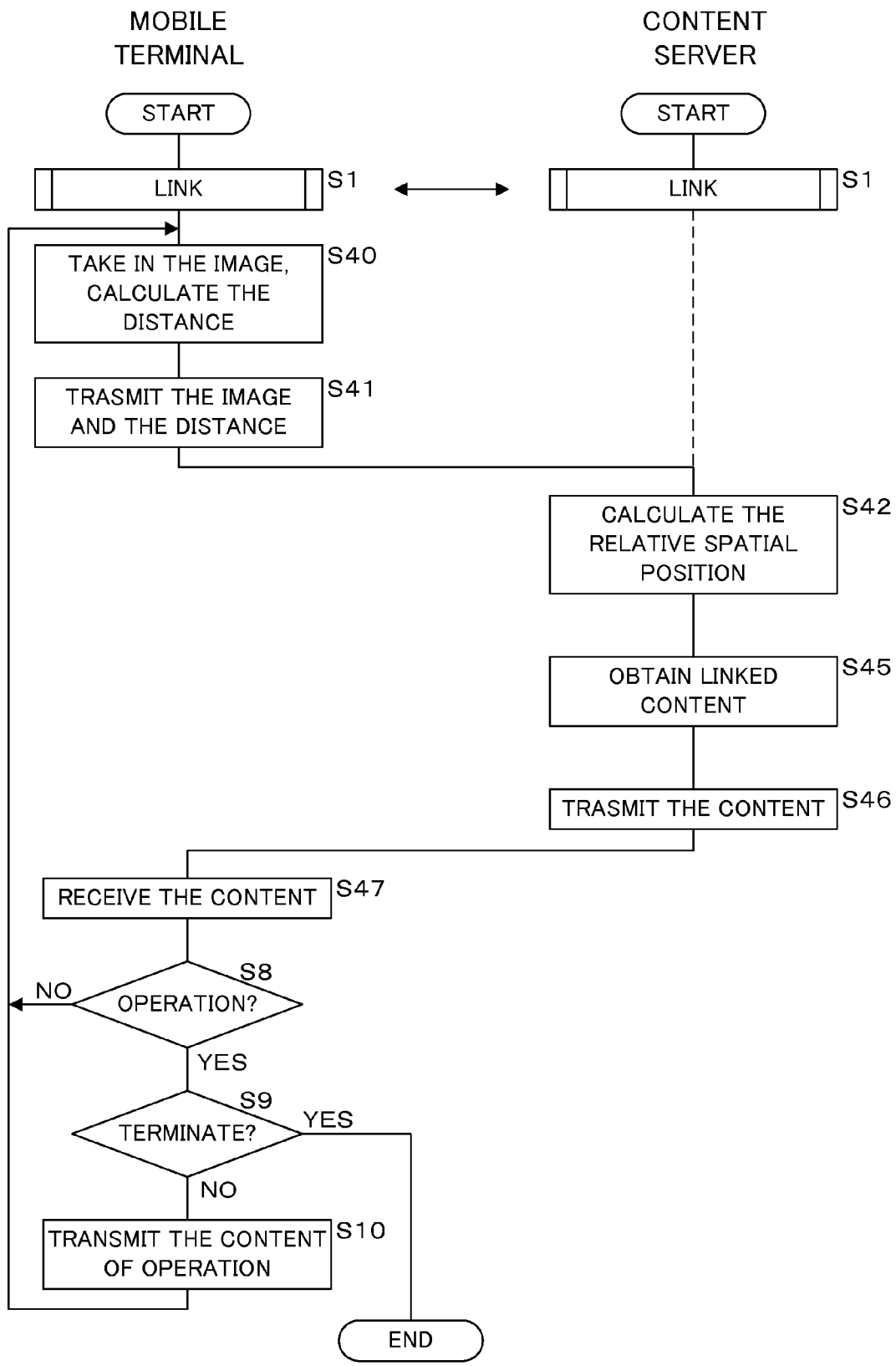
FIG. 22 is a flowchart illustrating an operation procedure of an information providing system.

FIG. 22 is a flowchart illustrating an operation procedure of an information providing system. The CPU 31a of the mobile terminal 3 controls the communication part 36 and establishes a link with the content server 1 (step S1). The image illustrated in FIG. 20 is shown on the display 2. The user photographs, for example, the facial part (region f) of the woman with the mobile terminal 3. The CPU 31a of the mobile terminal 3 obtains an image from the camera module 32a while calculating the distance between the mobile terminal 3 and the display 2 based on the focal distance obtained from the AF mechanism 32b (step S40). The CPU 31a transmits the obtained image and distance to the content server 1 (step S41). The CPU 11a of the content server 1 receives the image and distance transmitted from the mobile terminal 3. Matching is performed between the received image and the image shown on the display 2 (walk#woman.jpg), to specify the photographed portion (region f) (step S42). Here, the region ID of the region f is 11. The CPU 11a obtains an advertisement entity file name "cosme.mpg" from the advertisement field of the record for the region ID=11, as content to be transmitted (step S45). The content is a video image file, but not limited thereto, may also be a still image. The CPU 11a transmits the entity file "cosme.mpg" to the mobile terminal 3 (step S46). It is also possible here to cause the mobile terminal 3 to display a virtual button for displaying a shop guide. Alternatively, a hyperlink may be set for displaying a shop guide in an image to be displayed.

The CPU 31a of the mobile terminal 3 receives the advertisement entity file "cosme.mpg" and displays the file on the display part 34 (step S47). The CPU 31a monitors whether operation from the user is not performed for a predetermined period of time (step S8), and if operation is performed (YES at step S8), the CPU 31a determines if it is a terminating operation (step S9). If it is a terminating operation (YES at step S9), the CPU 31a establishes a communication link or the like with the content server 1 and terminates the processing. If it is not the terminating operation (NO at step S9), the CPU 31a transmits the content of operation to the content server 1 (step S10), and returns the processing to step S40. If no operation is performed (NO at step S8), the CPU 31a returns the processing to step S40. The operation here corresponds to, for example, the operation of using the virtual button for displaying a shop guide to select a link to the shop guide set in the image. In this case, the CPU 31a requests the content server 1 for shop guide information (step S10). Similar processing is performed again from step S40. The CPU 11a of the content server 1 transmits shop guide data to the mobile terminal 3 in accordance with the request from the mobile terminal 3 (step S46). The CPU 31a of the mobile terminal 3 displays the received shop guide data on the display part 34 (step S47).

In the case where the user photographs the high heels worn by the woman, the CPU 11a determines that the image portion corresponding to the region ID 13 or 14 is photographed. Thus, an advertisement related to high heels is displayed on the display part 34 of the mobile terminal 3. Moreover, operation by the user causes the display part 34 to display the shop guide for high heels.

As described above, by obtaining the portion gazed by the user in the image shown on the display 2 as an image, it is possible to distribute an advertisement suitable for the user.

In the present embodiment, it is also possible to count the number of times an advertisement is distributed to the user and to charge the advertiser depending on the number of times. Furthermore, tallying of the portions gazed by the user can find which part of the advertised image most attracted the user, which makes it possible to check the advertising effectiveness.

Embodiment 5

Figure 23:
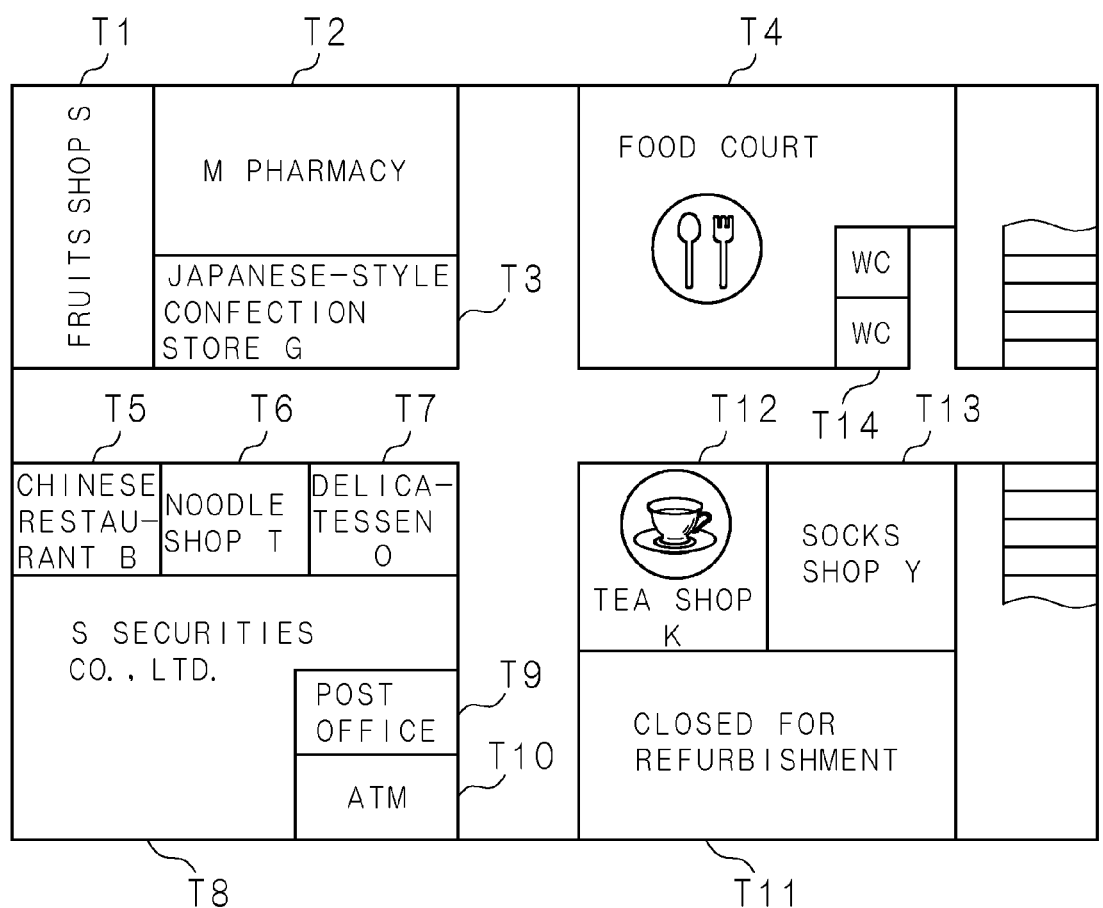
FIG. 23 is an explanatory view illustrating an example of a guide map shown on a display.
Figure 24A:
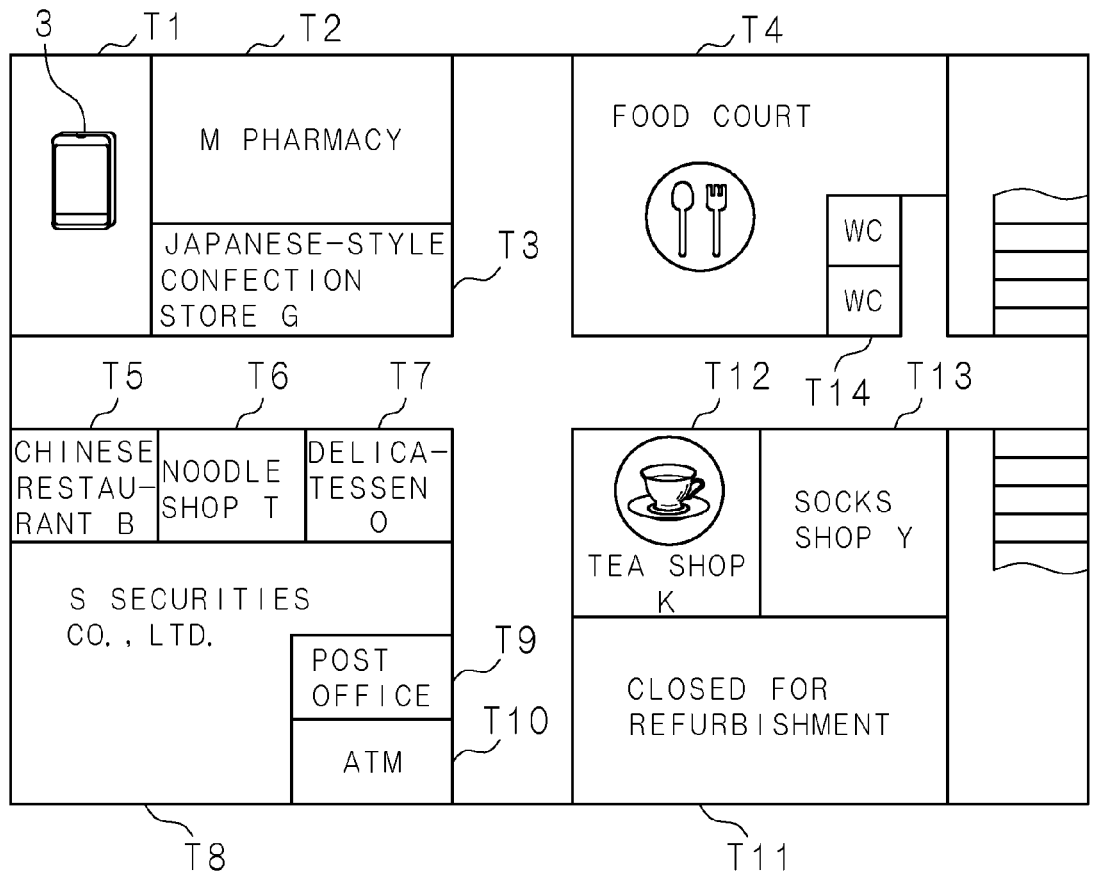
FIG. 24A is an explanatory view for the case where store information is obtained by holding a mobile terminal over a map.
Figure 24B:
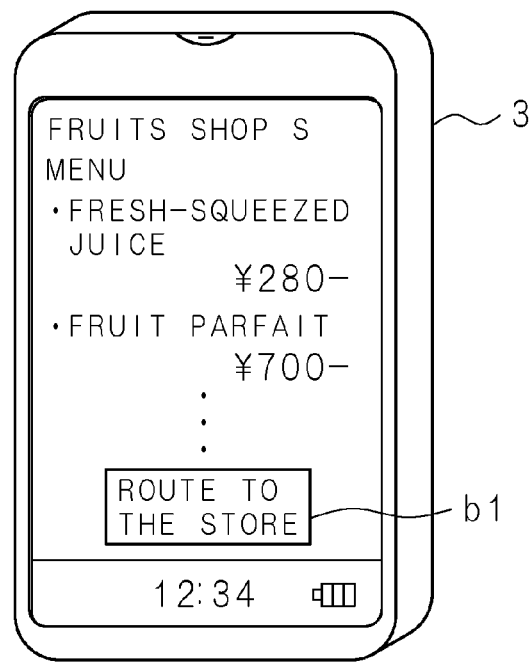
FIG. 24B is an explanatory view for the case where store information is obtained by holding a mobile terminal over a map.

The present embodiment describes the use as an information map of a department store, shopping mall or the like. FIG. 23 is an explanatory view illustrating an example of a guide map shown on the display 2. The arrangement of multiple stores are illustrated as shown in FIG. 23. FIGS. 24A and 24B show explanatory views for the case where store information is obtained by holding the mobile terminal 3 over the map. FIG. 24A illustrates an example where the mobile terminal 3 is held over the portion of a store T1. FIG. 24B illustrates an example of information on the store T1 to be displayed on the mobile terminal 3. Here, the menu offered by the store T1 is displayed.

When the user pushes the button b1 displayed on the mobile terminal 3, a route to the store T1 is displayed. It is possible to measure the interest level for a store by the content server 1 storing the history of stores for which the user obtained the information. Moreover, by storing in the content server 1 the number of times a button b1 is pressed and the route information to the store is obtained, a store hard to find the route thereto on the current guide map may become apparent. It is also possible to provide a button for obtaining a coupon which can be used in a store on the screen of the mobile terminal 3. This motivates the user to stop by at the store. As the operation of the information providing system is similar to that in Embodiment 4, except for the content of information handled, description thereof will not be repeated.

Embodiment 6

In Embodiment 6, an image shown on a paper medium such as a poster, not on the display 2, is used. FIG. 25 is an explanatory view illustrating a schematic configuration of an information providing system according to Embodiment 6. The information providing system according to the present embodiment includes a content server 1, mobile terminal 3 and poster 4. Since the content server 1 and mobile terminal 3 have configurations similar to those in Embodiment 1 described above, the parts different from each other will mainly be described.

The poster 4 is made by printing an advertisement image or the like on a paper medium. The data of the advertisement image is stored in the content database 12 of the content server 1. For example, in the case where the image illustrated in FIG. 25 as described above is printed on the poster 4, by photographing a part of the poster 4, e.g., the part of the purse, and transmitting the photographed image to the content server 1, as in Embodiment 4, the advertisement information related to a purse is transmitted to the mobile terminal 3. Thus, even with the image printed on the poster 4, the operation of the information providing system is similar to that in Embodiment 4 as described above, which will not be described here.

In the case of using the poster 4, an image to be compared with the image transmitted from the mobile terminal 3 is specified to one, since the content of display is controlled by the content server 1. In the case of the image on the poster 4, however, it is necessary to specify the photographed poster, except for the case where the content server 1 holds one piece of image data. For this purpose, it may be possible, for example, that the background color is changed for each poster or that a watermark which cannot be recognized by the naked eye is printed for each poster. It may alternatively be possible that the user initially enters a poster ID by text input or reading a two-dimensional bar code, and the ID is transmitted to the content server 1 together with the photographed image. It is needless to say that any other known technique may be used as long as a poster can be specified.

According to the present embodiment, the need for a display showing an image is eliminated, allowing the operation with lower cost compared to the case of using a display.

While the content server 1 includes the image processing part 13 and the image to be transmitted to the mobile terminal 3 is generated by the image processing part 13, the present invention is not limited thereto. The image processing part 13 may be eliminated and an image may be generated by the control part 11. It is also possible that an image processing device is separately prepared as a hardware separated from the content server 1 and is caused to generate an image. In this case, data necessary for image generation is transmitted from the content server 1 to the image processing device, which generates an image based on the received data and transmits the generated image to the content server 1.

Embodiment 7

In Embodiments 1 to 5 described above, it is assumed that the content server 1 causes a single display 2 to display content data. It is also assumed that the content server 1 and the mobile terminal 3 are close to each other, and data is transmitted/received through Near Field Communication. The present invention is, however, not limited thereto. Embodiment 7 is described on the assumption that the content server 1 is connected to the television receiver 20 (corresponding to the display 2) and the mobile terminal 3 through a network.

Figure 26:
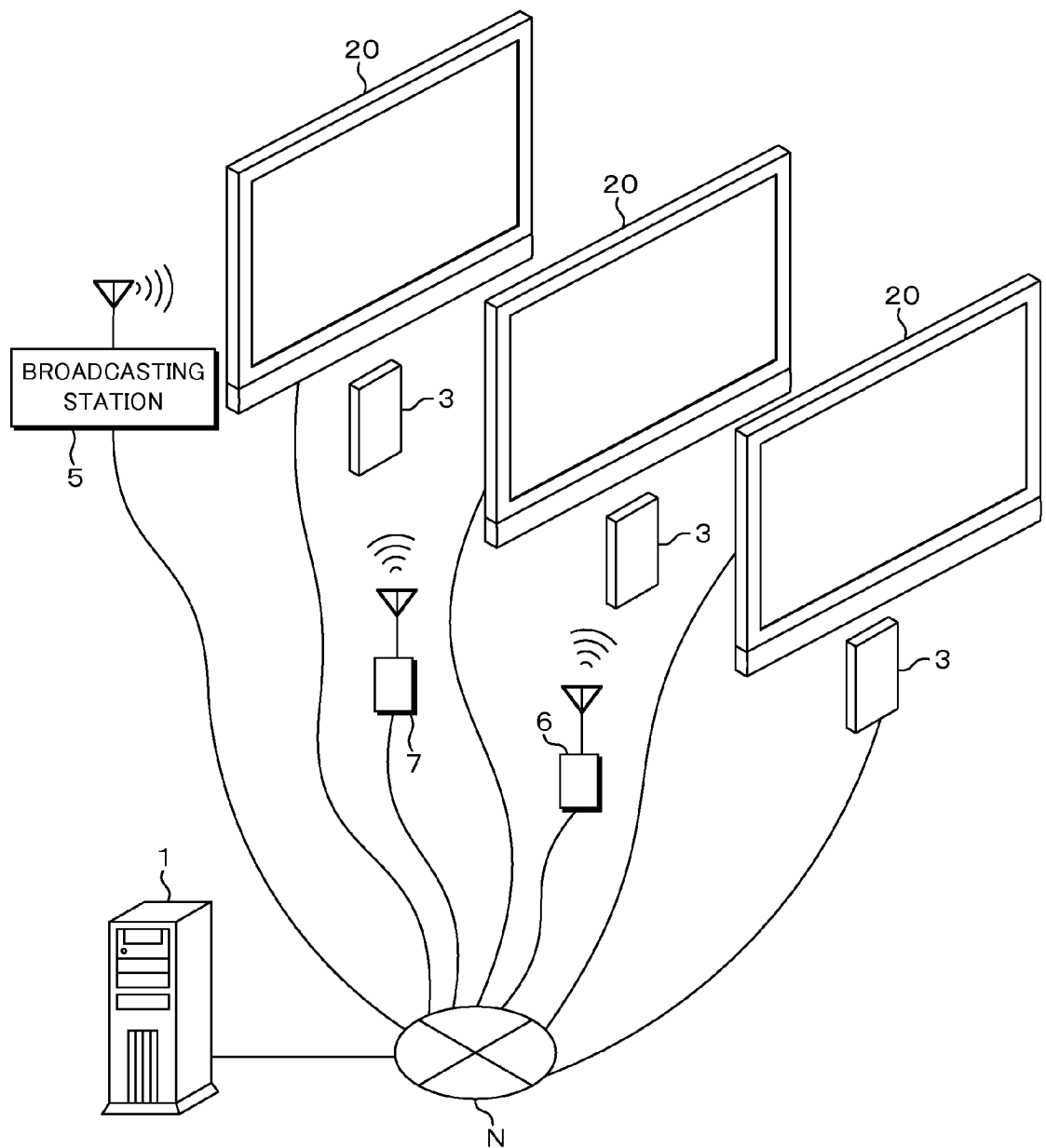
FIG. 26 is an explanatory view illustrating a schematic configuration of an information providing system according to Embodiment 7.

FIG. 26 is an explanatory view illustrating a schematic configuration of an information providing system according to Embodiment 7. The information providing system includes a content server 1 (computer), television receiver 20 (display), mobile terminal 3 (mobile communication device), broadcasting station 5, public wireless LAN access point 6, mobile phone base station 7, network N such as the Internet, and the like.

The broadcasting station 5 propagates the content data received from the content server 1 through the network N to the television receiver 20 through broadcasting. The content data may be broadcasted as normal television broadcast, data broadcast, or Hybridcast (registered trademark).

In addition to communication via wired network, the content server 1 and mobile terminal 3 communicate with each other through pubic wireless LAN and public wireless LAN access, or a mobile phone network and mobile phone base station 7.

Figure 27:
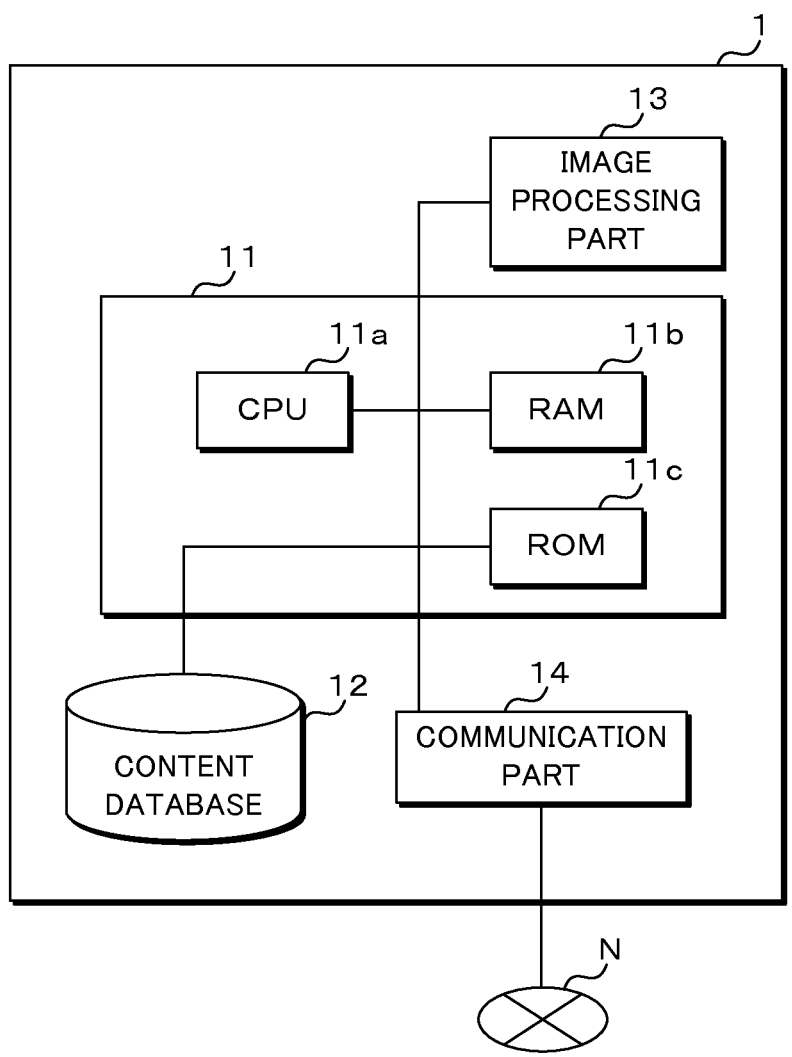
FIG. 27 is an explanatory view illustrating a hardware configuration of a content server.

FIG. 27 is an explanatory view illustrating a hardware configuration of the content server 1. The content server 1 includes a control part 11, content database 12, image processing part 13 and communication part 14. The control part 11 includes a CPU 11a, RAM 11b and ROM 11c.

Among the parts of the content server 1, parts similar to those of the content server 1 according to Embodiment 1 will not be described. In Embodiment 7, the content server 1 transmits/receives data to/from the television receiver 20 via a communication line. Furthermore, the communication with the mobile terminal 3 is also performed via a communication line.

Figure 28:
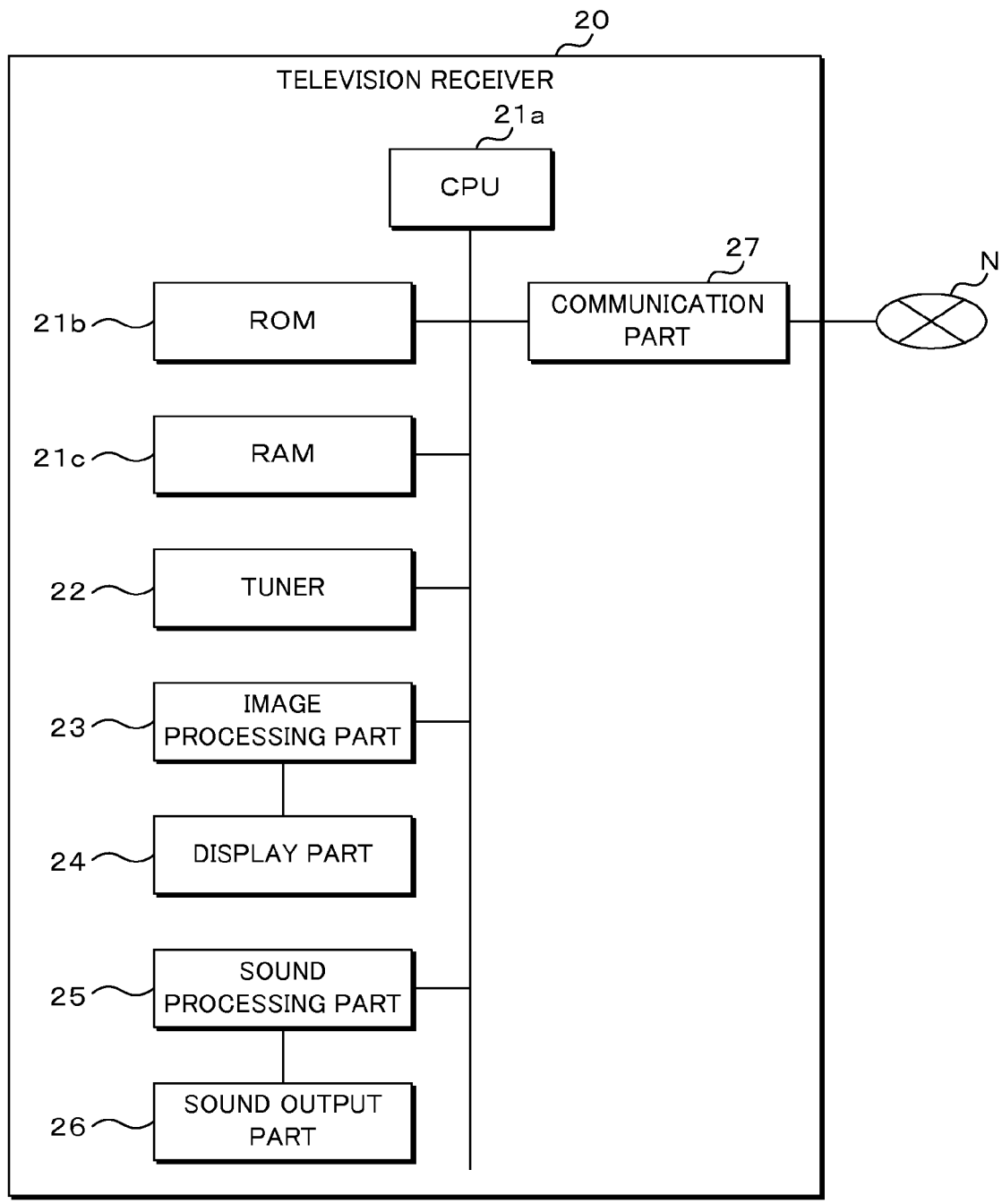
FIG. 28 is an explanatory view illustrating a hardware configuration of a television receiver.

FIG. 28 is an explanatory view illustrating a hardware configuration of the television receiver 20. The television receiver 20 includes a CPU 21*a*, ROM 21*b*, RAM 21*c*, tuner 22, image processing part 23, display part 24, sound processing part 25, sound output part 26 and communication part 27. The CPU 21*a* is connected to each of the hardware units through a bus. The CPU 21*a* controls each hardware unit in accordance with a control program (computer program) stored in the ROM 21*b*. The RAM 21*c* is, for example, SRAM (Static RAM), DRAM (Dynamic RAM), flash memory or the like. The RAM 21*c* temporarily stores various pieces of data generated when the CPU 21*a* executes different programs.

The tuner 22 selects appropriate electric wave from multiple kinds of electric waves received by an antenna from the broadcasting station 5, divides the image data included in the selected electric wave into video data and audio data, and outputs the two kinds of data respectively to the image processing part 23 and the sound processing part 25. Here, the image data means data including video data and audio data that are synchronized with each other. The image processing part 23 outputs the video data input from the tuner 22 or communication part 27 to the display part 24 after applying appropriate image processing thereto. The display part 24 is configured by, for example, using a color liquid-crystal display panel, and displays a video image based on the input video data in synchronization with the sound output from the sound output part 26. The sound processing part 25 outputs the audio data input from the tuner 22 or communication part 27 to the sound output part 26 after applying appropriate sound processing thereto. The sound output part 26 is configured by using a speaker, and outputs sound based on the input audio data in synchronization with the video image displayed on the display part 24.

The television receiver 20 receives content data conveyed on the broadcast wave through a tuner. The content data transmitted through a communication line such as the Internet is received through the communication part 27.

Figure 29:
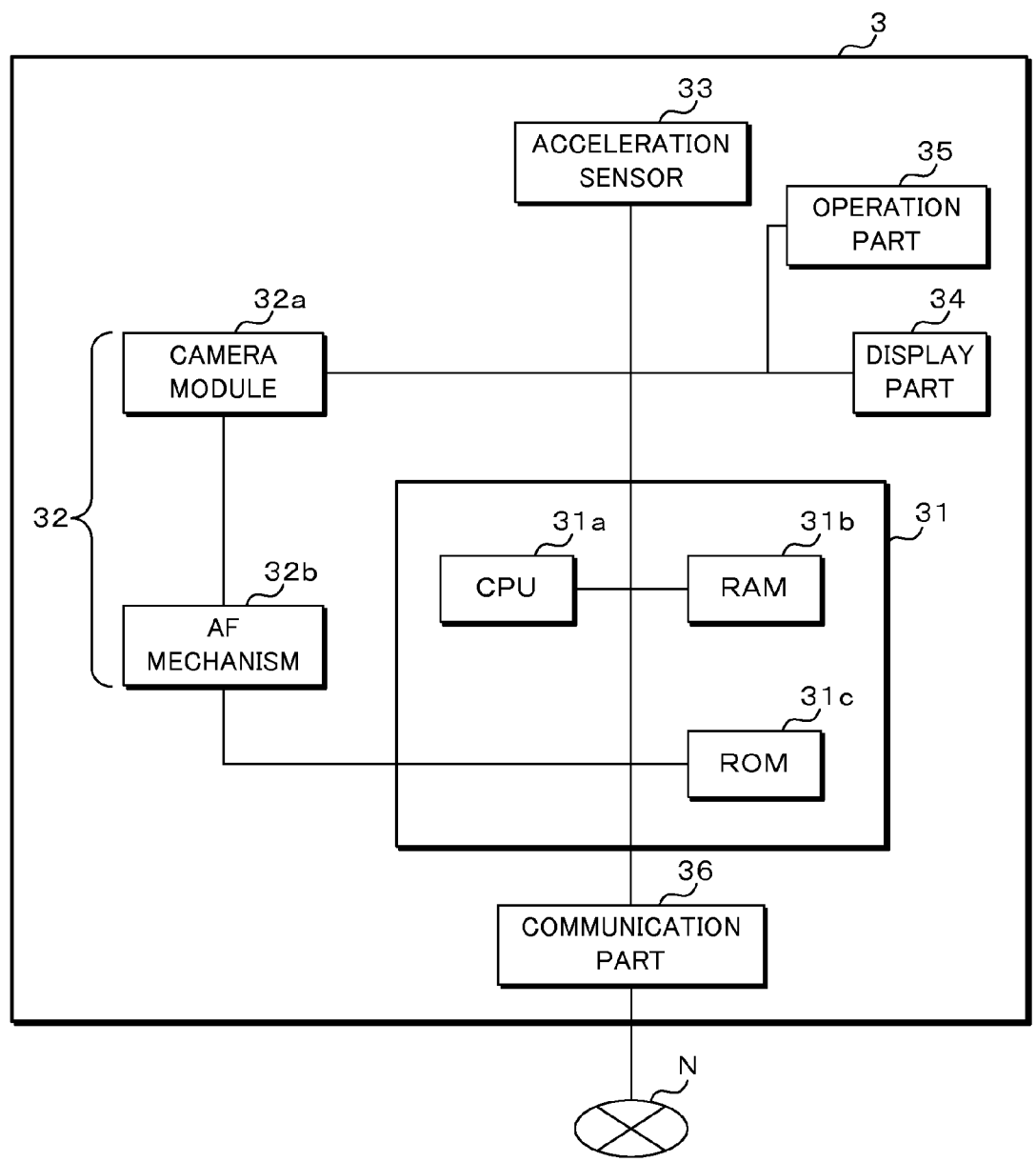
FIG. 29 is an explanatory view illustrating a hardware configuration of a mobile terminal.

FIG. 29 is an explanatory view illustrating a hardware configuration of a mobile terminal 3. The mobile terminal 3 includes a control part 31, a camera part 32, an acceleration sensor 33, a display part 34, an operation part 35 and a communication part 36. The control part 31 includes a CPU 31*a*, a RAM 31*b* and a ROM 31*c*.

The CPU 31*a* is connected to each of the hardware units through a bus. The CPU 31*a* controls each hardware unit in accordance with the control program stored in the ROM 31*c*. The RAM 31*b* is, for example, an SRAM, a DRAM, a flash memory or the like. The RAM 31*b* temporarily stores various kinds of data generated when the CPU 31*a* executes different programs.

The camera part 32 includes a camera module 32*a* and an AF mechanism 32*b*. The camera module 32*a* includes a lens system, an imaging device and the like, and obtains an image. The AF mechanism 32*b* controls the lens system of the camera module 32*a* and automatically brings the lens into focus. The acceleration sensor 33 differentiates the measured acceleration of the mobile terminal 3 in a predetermined direction to calculate the inclination of the mobile terminal 3. On the display part 34, the image photographed by the camera module 32*a*, the contents transmitted by the content server 1, a button for operation, a menu and the like are displayed. The operation part 35 includes, for example, a button for operating the mobile terminal 3 and a touch panel for using the display part 34 in the operation.

The communication part 36 communicates with the content server 1 through the network N. The mobile terminal 3 transmits to the content server 1, for example, the image photographed by the camera module 32*a*, the distance to the display 2, the inclination angle of the mobile terminal 3 obtained from the measured value of the acceleration sensor 33, and operation information. From the content server 1, content image and the like are transmitted.

The communication part 36 is connected to the network N through the mobile phone base station 7 or an access point of WiMAX and communicates with the content server 1. The communication part 36 is further connected to a public wireless LAN through WiFi and communicates with the content server 1 through the network N from the public wireless LAN.

Figure 30:
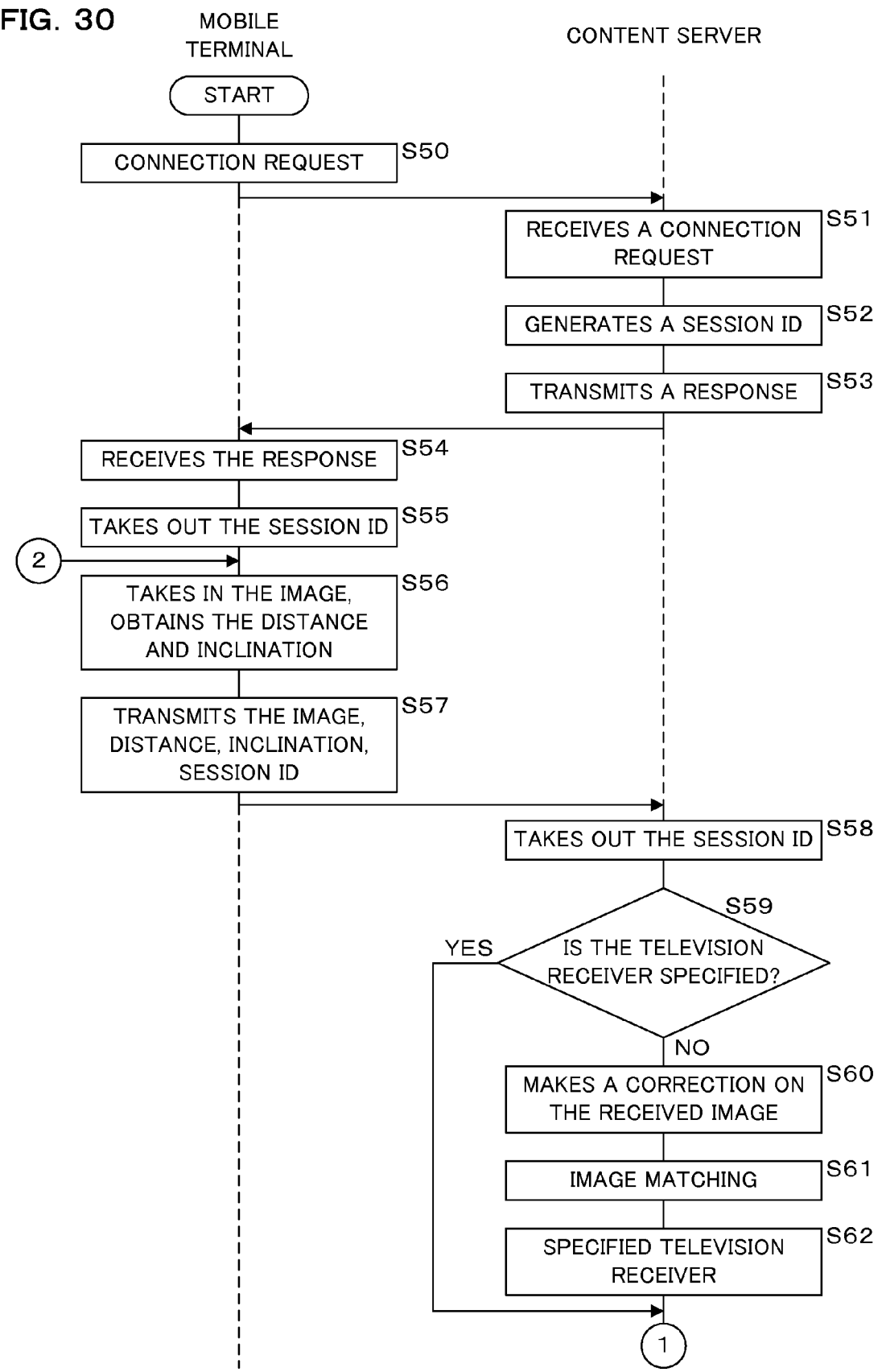
FIG. 30 is a flowchart illustrating an operation procedure of an information providing system.
Figure 31:
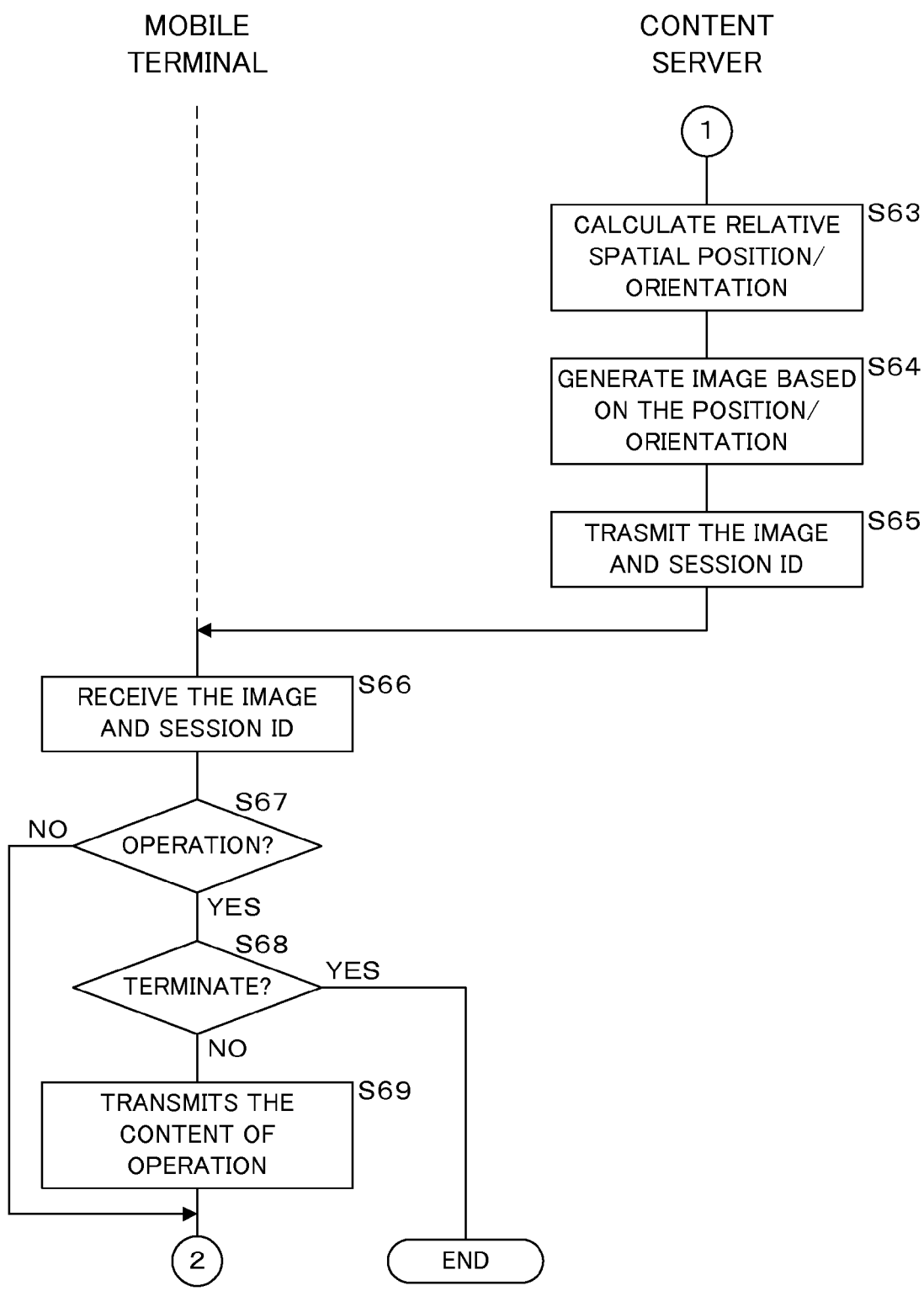
FIG. 31 is a flowchart illustrating an operation procedure of an information providing system.

Next, the operation of the information providing system according to Embodiment 7 is described. FIGS. 30 and 31 show a flowchart illustrating the operation procedure of the information providing system. In response to user operation, the mobile terminal 3 transmits a connection request to the content server 1 (step S50). The content server 1 receives a connection request from the mobile terminal 3 (step S51). The content server 1 starts a new session, and generates a session ID (step S52). A session is a structure for managing data transmission/reception between the content server 1 and the mobile terminal 3, which is similar to the one used in a Web server. A session ID is an ID for specifying a session, and the content server 1 uses the session ID to specify the mobile terminal 3.

The content server 1 transmits a response including a session ID to the mobile terminal 3 (step S53). The mobile terminal 3 receives the response from the content server 1 (step S54). The mobile terminal 3 takes out the session ID included in the response and stores it in the RAM 31*b* (step S55).

The user holds the mobile terminal 3 over the television receiver 20 and photographs an image of a gazed portion with the camera module 32*a* among the information displayed on the television receiver 20. The CPU 31*a* of the mobile terminal 3 controls the camera module 32*a* to take in the image, while obtaining a distance between the mobile terminal 3 and the television receiver 20 from the motion result of the AF mechanism 32*b* at the time of taking in the image. Moreover, the acceleration sensor 33 calculates the inclination of the mobile terminal 3 from the result of measurement (step S56). The CPU 31*a* of the mobile terminal 3 transmits the obtained image and distance, the calculated inclination, and the session ID to the content server 1 (step S57).

The CPU 11*a* of the content server 1 takes out a session variable using the session ID included in the data received by the mobile terminal 3 (step S58). The CPU 11*a* of the content server 1 refers to the session variable and determines whether or not the television receiver 20 corresponding to the mobile terminal 2 is specified (step S59). If the television receiver 20 is specified (YES at step S59), i.e. if information for specifying a television receiver is included in the session variable, the CPU 11*a* of the content server 1 proceeds to step S63. If the television receiver 20 is not specified (NO at step S59), the CPU 11*a* of the content server 1 receives the image, distance and inclination from the mobile terminal 3 and makes a correction on the received image based on the received distance and inclination (step S60). More specifically, a correction for returning an inclined image to original and a correction for adjusting the resolution of the image are performed. This is to enhance the accuracy of matching performed thereafter. The content server 1 performs matching between the corrected image and the image distributed to the television receiver 20 (step S61). Matching may be performed using a known technique.

The CPU 11*a* of the content server 1 specifies the television receiver 20 on which the obtained image is displayed based on the result of matching, and stores the association between a session ID and the specified television receiver 20 in the RAM 11*b* (step S62).

Using the result specified at step S62 or the association between the session ID and the television receiver, the CPU 11*a* of the content server 1 detects the position of the received image in the image displayed on the television receiver 20, based on the image, distance and inclination received by the mobile terminal 3. That is, the position of the received image in the display surface of the television receiver 20 is detected. Based on the position, the position and orientation (relative spatial position/orientation) of the mobile terminal 3 with respect to the television receiver 20 is calculated (step S63). Based on the calculated position/ orientation, the CPU 11*a* specifies an area of an image to be transmitted to the mobile terminal 3. The CPU 11*a* specifies information corresponding to that area. The CPU 11*a* (reading part) reads out the information specified by the content database 12 and causes the image processing part 13 to generate an image (step S64). The CPU 11*a* transmits the generated image and the session ID to the mobile terminal 3 (step S65).

The CPU 31*a* of the mobile terminal 3 receives the image and session ID from the content server 1 (step S66). The CPU 31*a* causes the display part 34 to display the received image and waits for operation from the user (step S67). If the user performs any operation (YES at step S67), the CPU 31*a* determines whether or not it is a terminating operation (step S68). If it is the terminating operation (YES at step S68), the CPU 31*a* terminates the processing. If it is not the terminating operation (NO at step S68), the CPU 31*a* transmits the content of operation to the content server 1 (step S69), and returns the processing to step S56. If no operation is performed by the user after a predetermined period of time has elapsed (NO at step S67), the CPU 31*a* returns the processing to step S56. Subsequently, processing steps from S56 are repeated. The basic operation of the information providing system is as described above.

At the processing step S67 shown in FIG. 31, if the user has not performed a predetermined operation for a predetermined period of time, it is assumed that the processing is returned to step S56 and the mobile terminal 3 takes in an image again and transmits an image or the like to the content server 1. It is, however, not limited thereto and the waiting state may continue unless the user performs an explicit operation. The explicit operation is an operation of the user pressing a shutter button for photographing.

As described above, in Embodiment 7, the communication among the content server 1, television receiver 20 and mobile terminal 3 is conducted through a network. This allows the content server 1 to provide services to the multiple television receivers 20 and mobile terminals 3. It is possible to manage the content server 1 in a concentrated manner, facilitating the management. It further facilitates the maintenance of content data.

In Embodiment 7, as in Embodiment 1, it is possible to distribute contents for providing a facility guide using a map. It is further possible to distribute the contents described in Embodiments 2 to 5. The difference between Embodiments 1 to 5 and Embodiment 6 is that the content server 1 is connected to the television receiver (display). This difference corresponds to basic processing, which is as illustrated in FIG. 5 and FIGS. 30, 31. The content distribution which is applied processing is similar in the embodiments, and thus will not be described here.

The technical features (components) described in each example can be combined with each other, and may form a new technical feature by combining them.

The present embodiments described herein are to be considered as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information distribution apparatus including a distribution part distributing different pieces of information respectively, stored in a storage device, to a plurality of displays, comprising:
    a reception part receiving, from the mobile communication device, image data corresponding to a part of the information displayed on the display obtained by the mobile communication device;
    a transmission part transmitting the information stored in the storage device to the mobile communication device;
    a second specifying part specifying the display from which the mobile communication device obtained image data, by matching between an image to be displayed on each of the plurality of displays and the image received from the mobile communication device; and
    a specifying part specifying information to be transmitted to the mobile communication device, based on the image data received by the reception part.

2. The information distribution apparatus according to claim 1, wherein
    the information is advertisement information containing an advertisement ID and an advertising image,
    the transmission part transmitting the read-out advertisement information to the mobile communication device; and
    the information distribution apparatus comprises:
    a reading part reading out advertisement information specified by the specifying part from the storage device;
    and
    a counting part counting the number of times the advertisement information is transmitted, for each of the advertisement ID.

3. The information distribution apparatus according to claim 1, wherein
    the reception part receiving, by the mobile communication device, image data corresponding to a part of the information displayed on the display and data corresponding to a distance between a mobile communication device and the display, obtained by the mobile communication device; and
    the specifying part specifying information to be transmitted to the mobile communication device, based on the image data and the data corresponding to the distance, received by the reception part.

4. The information distribution apparatus according to claim 1, wherein
    the specifying part specifying information to be transmitted to the mobile communication device, based on the image data received by the reception part and the display specified by the second specifying part.

5. The information distribution apparatus according to claim 3, wherein
the specifying part specifying information to be transmitted to the mobile communication device, based on the image data and the data corresponding to the distance, received by the reception part, and the display specified by the second specifying part.

6. An information distribution method, comprising:
by a computer,
distributing different pieces of information respectively to a plurality of displays;
receiving image data corresponding to a part of the information displayed on the display; and
specifying the display from which the mobile communication device obtained image data by matching between an image to be displayed on each of the plurality of displays and the image received from the mobile communication device; and
specifying information to be transmitted based on the received image data.

7. An information distribution apparatus including a storage device in which a plurality of different advertisement images respectively and advertisement data concerning each of the advertisement images, comprising:
a reception part receiving, from the mobile communication device, image data corresponding to a part of the advertisement image obtained by a mobile communication device from a medium on which the advertisement image is displayed;
a transmission part transmitting advertisement data stored in the storage device to the mobile communication device;
a second specifying part specifying one of the advertisement images which are stored the storage device from which the mobile communication device obtained image data, by matching between each of the advertisement images and the image received from the mobile communication device; and
a specifying part specifying advertisement data to be transmitted to the mobile communication device, based on the image data received by the reception part.

8. The information distribution apparatus according to claim 7, wherein
the reception part receiving, from the mobile communication device, image data corresponding to a part of the advertisement image obtained by a mobile communication device from a medium on which the advertisement image is displayed, and data corresponding to a distance between the mobile communication device and the medium;
the specifying part specifying advertisement data to be transmitted to the mobile communication device, based on the image data and the data corresponding to the distance, received by the reception part.

9. The information distribution apparatus according to claim 7, wherein
the specifying part specifying advertisement data to be transmitted to the mobile communication device, based on the image data received by the reception part and the advertisement image specifying by the second specifying part.

10. The information distribution apparatus according to claim 8, wherein
the specifying part specifying advertisement data to be transmitted to the mobile communication device, based on the image data and the data corresponding to the distance, received by the reception part, and the advertisement image specifying by the second specifying part.

* * * * *